US011931657B2

(12) United States Patent
Summa et al.

(10) Patent No.: US 11,931,657 B2
(45) Date of Patent: Mar. 19, 2024

(54) GAMING EXPERT CONNECTION FOR GAMING ASSISTANCE

(71) Applicant: Dell Products L.P., Round Rock, TX (US)

(72) Inventors: Erik Summa, Austin, TX (US); Marc Randall Hammons, Round Rock, TX (US); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 199 days.

(21) Appl. No.: 17/646,915

(22) Filed: Jan. 4, 2022

(65) Prior Publication Data

US 2023/0211241 A1 Jul. 6, 2023

(51) Int. Cl.
*A63F 13/87* (2014.01)
*A63F 13/285* (2014.01)
*A63F 13/355* (2014.01)
*G06Q 10/0631* (2023.01)
*G06Q 10/0639* (2023.01)

(52) U.S. Cl.
CPC ............ *A63F 13/87* (2014.09); *A63F 13/285* (2014.09); *A63F 13/355* (2014.09); *G06Q 10/063112* (2013.01); *G06Q 10/06398* (2013.01)

(58) Field of Classification Search
CPC ...... A63F 13/87; A63F 13/285; A63F 13/355; A63F 13/35; A63F 13/533; A63F 13/86; G06Q 10/063112; G06Q 10/06398
USPC ......................................................... 463/42
See application file for complete search history.

(56) References Cited

U.S. PATENT DOCUMENTS

| | | | | |
|---|---|---|---|---|
| 2008/0148165 | A1* | 6/2008 | Zalewski | A63F 13/12 715/764 |
| 2010/0081116 | A1* | 4/2010 | Barasch | G09B 19/0038 434/308 |
| 2013/0290202 | A1* | 10/2013 | Nunnery | G06Q 50/01 705/319 |
| 2014/0156645 | A1* | 6/2014 | Brust | G06F 3/0481 707/722 |
| 2015/0065220 | A1* | 3/2015 | Nabi | G07F 17/323 463/31 |
| 2015/0379891 | A1* | 12/2015 | Wallace | H04L 51/02 434/236 |

(Continued)

FOREIGN PATENT DOCUMENTS

KR 20210109174 * 9/2021 ..... G06Q 10/063112

OTHER PUBLICATIONS

Optical X, "Gamer Sensei Overview/Review", https://www.youtube.com/watch?v=-SJIMJ1njI4, May 26, 2019 (Year: 2019).*

*Primary Examiner* — Michael A Cuff
(74) *Attorney, Agent, or Firm* — Norton Rose Fulbright US LLP

(57) ABSTRACT

An information handling system may receive a request from a user for expert assistance associated with a gaming application. The information handling system may determine a recommendation of one or more experts from a plurality of available experts based, at least in part, on the gaming application and one or more gaming characteristics of each of the plurality of available experts. The information handling system may initiate a gaming assistance session between the user and at least one of the determined experts.

20 Claims, 16 Drawing Sheets

(56) References Cited

U.S. PATENT DOCUMENTS

| | | | |
|---|---|---|---|
| 2017/0087460 A1* | 3/2017 | Perry | A63F 13/497 |
| 2017/0266569 A1* | 9/2017 | Sullivan | A63F 13/358 |
| 2019/0371194 A1* | 12/2019 | Rom | G09B 19/22 |
| 2021/0308587 A1* | 10/2021 | Zhou | A63F 13/798 |
| 2022/0122141 A1* | 4/2022 | Bhardwaj | G06Q 30/0611 |
| 2022/0288499 A1* | 9/2022 | Zhou | A63F 13/798 |
| 2023/0173343 A1* | 6/2023 | Cohen | A63B 24/0075 |
| | | | 348/14.02 |

* cited by examiner

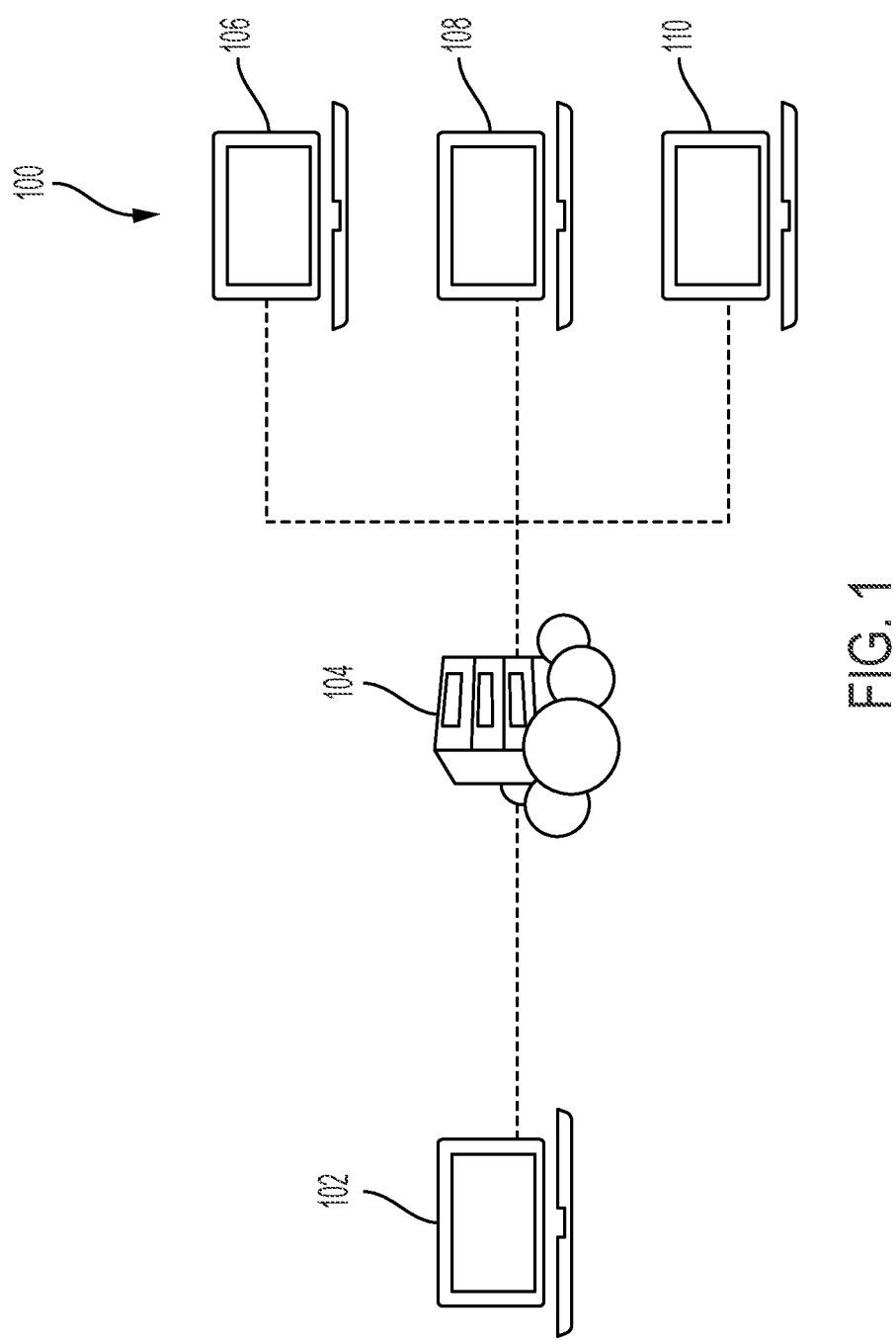

GAMING EXPERT CONNECTION FOR GAMING ASSISTANCE

FIELD OF THE DISCLOSURE

The present disclosure generally relates to information handling systems, and more particularly relates to connecting users of information handling systems with gaming experts.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

One increasingly popular use for information handling systems is gaming. Information handling systems can be utilized by users to execute a variety of gaming applications, such as strategy games, adventure games, first person shooter games, racing games, sports games, simulation games, role playing games, platformer games and other games. Gaming applications may range in difficulty from easy to learn by a non-gamer to difficult even for veteran gamers.

Oftentimes, when a user encounters a particularly difficult segment of a game or wishes to improve their skills, the user may consult online videos, written strategy guides, forums, message boards, friends, and other information sources for tips, strategies, and other assistance related to improving their skills with respect to a particular game. Such information sources, however, may be cumbersome to review and may not be tailored to the user's specific skill level, gaming style, personality, and interests.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may automatically pair a user, or "gamer," requesting assistance with a gaming application with another user, a "gaming expert," having a degree of expertise related to the gaming application. Automatic pairing of gamers with gaming experts may allow gamers desiring assistance with gaming applications to connect with one or more experts in gaming assistance sessions, which may include voice chat, screen sharing, text chat, and other forms of communication. In some gaming assistance sessions, input entered by the gamer may be transmitted to and indicated for the expert, and input entered by the expert may be transmitted to and indicated for the gamer. For example, video and audio produced for the gaming application on an information handling system of the gamer, such as a personal computer or laptop, may be transmitted to and displayed on a display of an information handling system of the expert. Additionally, inputs entered on peripherals, such a keyboard, mouse, gamepad, or other peripheral, connected to the information handling system of the gamer may be transmitted to the information handling system of the expert and may be displayed, along with the video and/or audio, for analysis by the expert. Thus, gamers may be connected with experts for real-time analysis and advice related to a particular gaming application. Such connections may enhance a user experience, by enabling users to obtain customized, on demand gaming assistance tailored to the specific challenges encountered by the user.

Pairing of gamers with experts may be performed based on gaming characteristics of the gamer and/or the expert, such as a general degree of gaming experience, a level of experience in a game genre of the gaming application for which assistance is requested, a level of experience in the particular gaming application for which assistance is requested, an age of the gamer or expert, one or more personality characteristics of the gamer or expert, a play style of the gamer or expert, and other gaming characteristics. In some cases, a level of expertise of an expert may be verified by determining one or more gaming characteristics of the expert related to gaming performance, such as an amount of time the expert has spent gaming, an amount of time the expert has spent playing games in a particular genre, an amount of time an expert has spent playing a particular game, a level of completion the expert has attained in a particular game, levels of completion the expert has attained in games of a particular genre, in game performance statistics, such as kill/death ratios or speed-run time records, and other gaming characteristics. Automatic pairing of gamers with experts based on gaming characteristics can enhance a user experience, by connecting gamers with experts having the expertise to provide assistance based on the gamer's skill level.

An information handling system may facilitate communication between gamers and gaming experts via gaming assistance sessions. An example method for communication between a user, such as a gamer, and a gaming expert, such as a user with expertise related to a gaming application, may begin with receipt, by a first information handling system, of a request from the user for expert assistance associated with a gaming application. The first information handling system may, for example, include a personal computer, tablet, smartphone, gaming console, or other information handling system operated by the user to execute one or more gaming applications. Alternatively or additionally, the first information handling system may include a server, such as a server of a cloud service, acting as an intermediary between an information handling system operated by a user to execute one or more gaming applications and an information handling system operated by an expert gamer to provide gaming assistance. Gaming applications may, for example, include puzzle games, role playing games, adventure games, first person shooter games, puzzle games, sports games, simulation games, strategy games, platformer games, and other games. A request for expert assistance may be made by a user when the user encounters a particularly challenging portion of a game. A user may, for example, select an icon for expert assistance to generate such a request, and the request may be received by an information handling system operated by the user or by a remote cloud-based information handling system. The request for expert assistance may include an indication of a gaming application with which the request is associated.

The first information handling system may determine a recommendation of one or more experts from a plurality of available experts based, at least in part, on the gaming application for which assistance is requested and one or more gaming characteristics of each of the plurality of available experts. Such determination may, for example, include receiving, by the first information handling system, a recommendation of one or more experts from a remote information handling system. In some embodiments, the first information handling system may receive the request from the user and may determine a plurality of available experts, such as experts that are currently online or have set their status to available. The first information handling system may then determine the recommendation of the one or more available experts based on one or more gaming characteristics of the available experts. For example, the information handling system may determine a level of expertise of each available expert related to the gaming application for which assistance was requested, a level of expertise of each available expert in gaming applications sharing one or more characteristics, such as a genre, with the gaming application for which assistance was requested, a level of general gaming expertise of each expert, an area of gaming expertise of each expert, a level of progress each expert has attained in the gaming application for which assistance was requested and/or other gaming applications in a genre of the gaming application for which assistance was requested, and other gaming experience and gaming skill indicators. In recommending experts, the information handling system may consider other gaming characteristics of the available experts, such as a gaming style of each expert, an age of each expert, one or more languages of each expert, one or more personality characteristics of each expert, and other characteristics of each expert. In some embodiments, the determination of a recommendation of available experts may be further based on one or more characteristics of the user requesting assistance. For example, the information handling system may recommend only experts that have at least one of more experience in the gaming application for which assistance was requested than the user requesting assistance or more experience in a gaming genre of the gaming application for which assistance was requested than the user requesting assistance. Likewise, the information handling system may determine a recommendation including only experts having a similar age, gaming style, or personality characteristics to the user requesting assistance. Thus, the information handling system may determine a recommendation of one or more experts from a plurality of available experts based on characteristics of the experts and the gaming application for which assistance is requested.

In some embodiments, the information handling system may present the recommendation of the determined plurality of gaming experts to the user requesting assistance to allow the user to select one or more of the experts for initiation of a gaming assistance session. The information handling system may further provide the user requesting assistance with information regarding gaming characteristics of the recommended experts, such as a number of hours each of the recommended experts has spent playing the game for which assistance is being requested.

The first information handling system may initiate a gaming assistance session between the user and at least one of the determined experts. For example, an information handling system operated by the user may initiate a direct connection with an information handling system operated by at least one of the determined experts. Alternatively or additionally, an information handling system operated by the user may transmit a request to an intermediary information handling system, such as a remote cloud server, to initiate a connection to a selected recommended expert. The intermediary information handling system may facilitate the connection between an information handling system operated by the user and an information handling system operated by the expert to provide enhanced privacy and security.

A gaming assistance session may, for example, include at least one of a text chat session between the user and at least one of the determined experts, a voice chat session between the user and at least one of the determined experts, or a game streaming session between the user and at least one of the determined experts. For example, in a game streaming session, a background service or application executed on the user's information handling system may capture graphics and audio data generated for the gaming application and may transmit, either directly or through an intermediary server, the graphics and audio data to an information handling system operated by the expert. The graphics and audio data may be displayed on a display of the information handling system operated by the expert to allow the expert to analyze the user's performance in the gaming application and provide tips and/or advice. Similarly, a chat or audio connection overlay may be presented on a display of the information handling system operated by the user to allow the user to engage in text and/or audio chat with the expert while continuing to use the gaming application.

In some embodiments, input data entered by the user requesting assistance via one or more peripherals, such as gamepads, keyboards, mice, touch screens, and other input devices, connected to the first information handling system may also be transmitted to an information handling system operated by the expert. An indication of the input data may be provided to the expert for analysis. For example, gamepad or key inputs may be displayed in a window on a display of the information handling system operated by the expert to allow the expert to analyze the user's input data. In some embodiments, input data entered by the expert via one or more peripherals, such as gamepads, keyboards, mice, touch screens, and other input devices, connected to the expert's information handling system may be transmitted to the information handling system operated by the user. An indication of the input data may be provided to the user. Live video of the expert playing the gaming application for which assistance was requested may be transmitted to the user along with input data from the expert. The input data and video may be synchronized and displayed on a display of the user's information handling system to allow the user to observe the expert's input associated with the video of the gaming application. In some embodiments, indications of the experts input may be provided in the form of haptic feedback in a gamepad connected to the user's information handling system, or illumination of keys of a keyboard connected to the user's information handling system. In some embodiments, gaming overlay input, such as mouse or touch screen input from the expert, may be received by the user's information handling system and may be overlaid on a window of the gaming application to allow the expert to indicate particular points of interest of the video data generated by the gaming application.

After a gaming assistance session, the information handling system may receive feedback regarding the user and/or the expert. For example, the information handling system may receive a rating of the expert from the user and/or a rating of the user from the expert. The rating may, for example, be a rating of helpfulness of the expert or a rating of agreeableness of the user. In some embodiments, the feedback may also include data regarding performance of the user following the gaming assistance session, such as data regarding performance improvements made by the user following the gaming assistance session. Based on the received feedback, the information handling system may update a rating of at least one of the user and the expert. For example, if a user's performance improves following the gaming assistance session, gaming characteristics of the expert, such as a level of expertise of the expert, may be adjusted or increased. Additionally, the expert may be rewarded with points or digital currency to reflect the assistance provided by the expert to the user. Gaming characteristics of the user may also be adjusted based on feedback received by the information handling system. For example, a user ranking of the user may be increased if the expert provides feedback indicating that the user is pleasant to work with.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1 is a layout of an example system for connecting users of gaming applications with gaming experts for gaming assistance sessions according to some embodiments of the disclosure.

DETAILED DESCRIPTION OF DRAWINGS

Figure 2A:
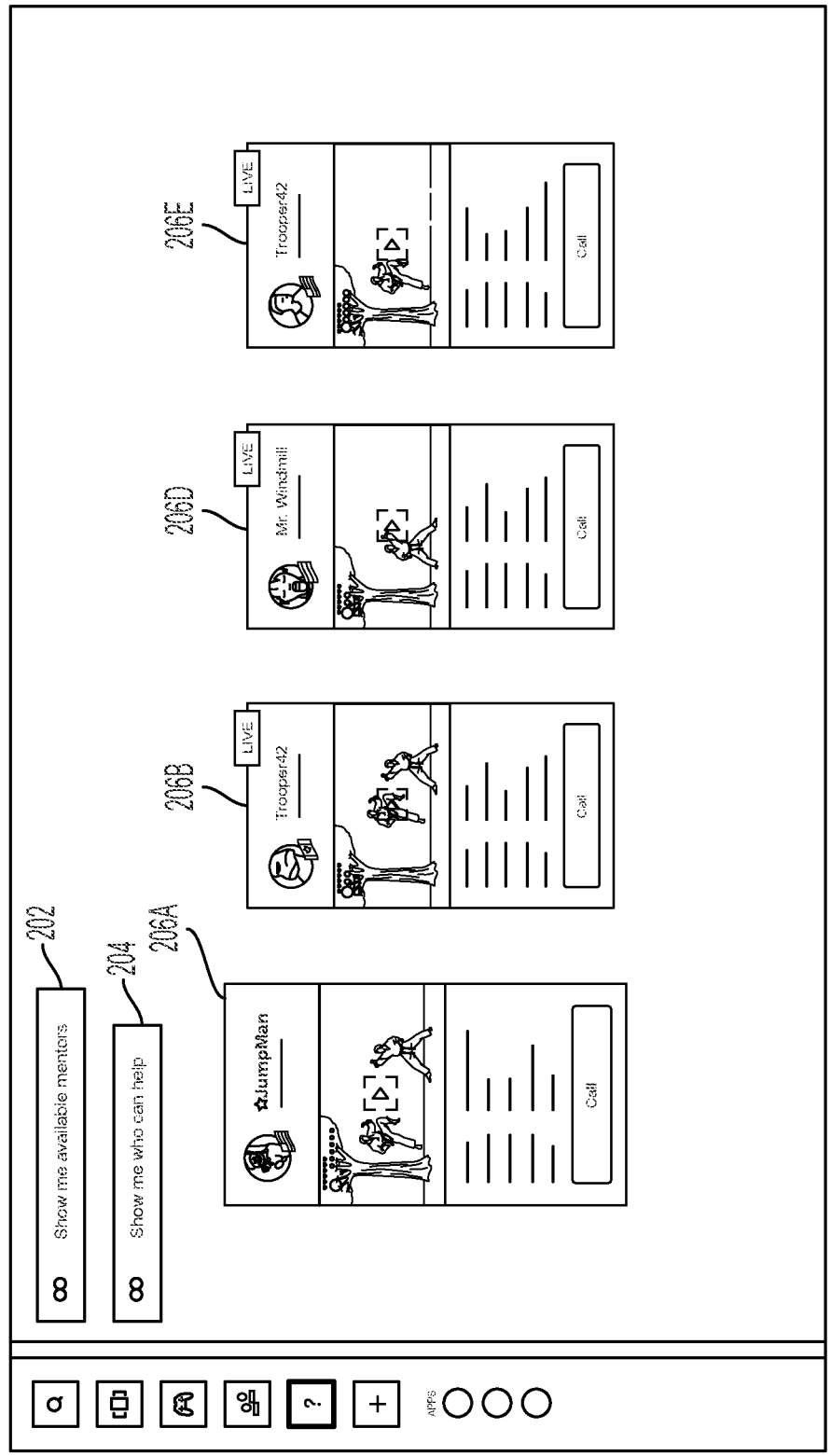
FIG. 2A is a first example layout of a user interface for facilitating connection between users and gaming experts according to some embodiments of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, determine, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, handheld gaming system, console gaming system, hybrid gaming system, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Information handling systems may be used for a variety of applications, such as gaming applications. When a user, or "gamer," executing a gaming application on their information handling system encounters a difficult portion of a game or would like to improve their skills for another reason, connection of the user with another information handling system user, one with expertise related to the gaming application, an "expert gamer," may enhance a user experience and build community. An example system 100 shown in FIG. 1, may include a first information handling system 102 operated by a user. For example, the first information handling system 102 may be a laptop computer, a desktop computer, a gaming console, a tablet, a smartphone, or other information handling system operated by a user. The user may operate the information handling system 102 to execute one or more gaming applications.

Similarly, other users may operate other information handling systems 106, 108, 110 to execute gaming applications. Users of information handling systems may have varying levels of expertise related to a particular gaming application, such as a level of general gaming experience or expertise, a level of experience or expertise in a game genre, and a level of experience or expertise in a particular gaming application. A level of general gaming experience may, for example, be determined based on a number of hours spent gaming by a user. Similarly levels of experience in genres or with particular gaming applications may be determined by a number of hours spent playing games in a genre or a particular gaming application. In some cases, levels of experience may be determined based on in-game activity, such as achievements earned, completion percentages, kill/death ratios, wins/losses, speed run records, and other in-game activity.

The system 100, such as a server 104, may assign users of information handling systems 102, 106, 108, 110 levels of expertise related to gaming in general, a particular genre of games, a particular mode of playing games, or a particular game. For example, users of information handling systems 102, 106, 108, 110 may indicate to the system 100 that they want to be assigned a level of expertise and and/or are available to consult with other gamers regarding one or more gaming applications. A remote server 104, for example, may maintain a database of gamers and associated levels of expertise. For example, users that have spent substantial time playing games in co-op mode may be assigned a high level of expertise in co-op mode gaming. Users that have invested a substantial amount of time in a gaming application may be assigned a high level of expertise in the gaming application. Users that have invested a substantial amount of time in a particular genre of games, such as strategy games, may be assigned a high level of expertise in strategy games. In some embodiments, the system 100 may provide a user with one or more goals to reach to be assigned a particular level of expertise. For example, a user may be assigned a goal of reaching a certain completion percentage or completing a main campaign of a gaming application for assignment of a particular level of expertise in the gaming application. A user that has been assigned a particular level of expertise related to a gaming application may be referred to as a "gaming expert." In some embodiments, a user may self-report a level of expertise, and a remote information handling system 104 may verify the user's self-reported level of expertise based on gaming data. Information handling systems 102, 104, 106, 108, and 110 may each include a memories and/or processors for performing the methods described herein. Such levels of expertise are examples of gaming characteristics that may be possessed by users and/or gaming experts.

When a user of an information handling system 102 encounters a difficult portion of a game or wishes to otherwise improve their gaming skills, the user may generate a request for connection with a gaming expert, such as a user of an information handling system 106, 108, 110 having a particular level of expertise in the gaming application. In some embodiments, a software application or background service in addition to the gaming application may receive such a request and may determine one or more experts for recommendation to the user. Alternatively or additionally, a server 104, such as a remote cloud-based server, may receive a request from a user of the information handling system 102 for connection to an expert and may determine one or more experts, such as users of information handling systems 106, 108, 110 for recommendation to the user based on one or more gaming characteristics of the experts, such as levels of expertise of the experts related to the gaming application for which assistance is requested. Such a recommendation may also be based on whether the expert is available, such as whether the expert is online and/or whether the expert has marked their status as available.

In some embodiments, a user interface may be provided to the user for requesting expert assistance. For example, a user's information handling system 102 may display a graphical user interface to facilitate connecting the user with one or more gaming experts, also referred to herein as "mentors." The user interface may, for example, be displayed by an application or background process for matching users with gaming experts. In the example graphical user interface 200 of FIG. 2A, an array of experts may be presented to a user following a request by the user for recommendation of one or more experts. Such a request may, for example, be made using a voice assistant. For example, voice commands 202, 204 may be received by a voice assistant via a microphone connected to the information handling system 102 and an array of suggested experts 206A-D may be presented to the user with an option, such as a call option, to initiate a gaming assistance session with each expert. The graphical user interface 200 may further display information related to the experts, such as a username of the one or more experts, a profile image of each of the one or more experts and a number of hours each of the recommended experts has spent in the game for which the user requires assistance. Other gaming characteristics related to each of the experts may also be displayed for the user to analyze in selecting one or more of the recommended experts. One or more areas of gaming expertise, such as strategy, combat, co-op, speed running, first person shooter, and other areas of expertise may be displayed. Language fluency of each expert may be displayed. A number of years of gaming experience for each of the experts may be displayed. A location of each of the experts may be displayed. The user interface 200 may, for example, be displayed over a window of a gaming application following a request by a user for expert assistance.

Figure 2B:
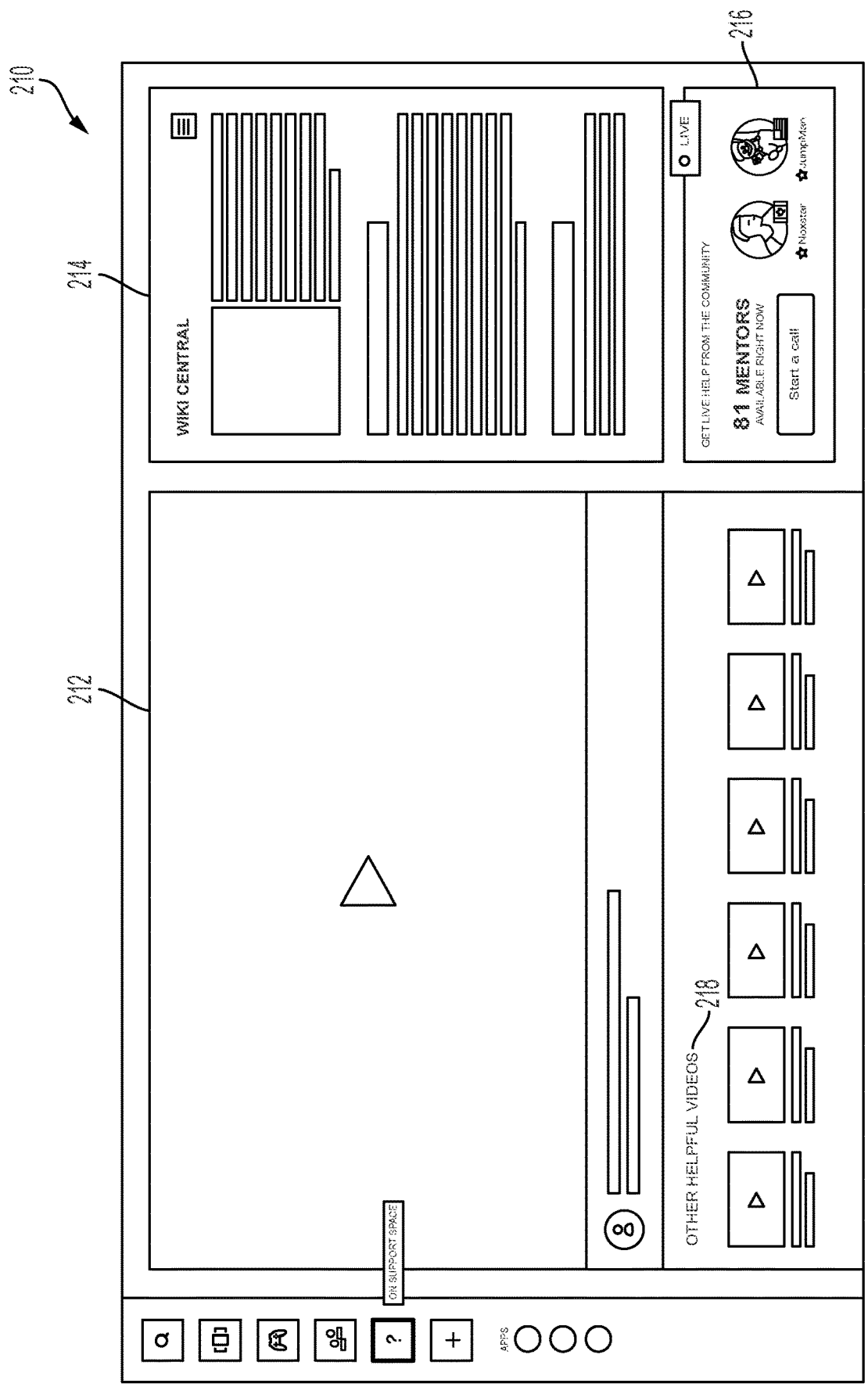
FIG. 2B is a second example layout of a user interface for facilitating connection between users and gaming experts according to some embodiments of the disclosure.

As another example, a graphical user interface 210, as shown in FIG. 2B, for an application or service may facilitate connection between the user and experts on a secondary display of the user's information handling system or on a display of another information handling system of the user. For example, the gaming application for which assistance is being requested may be shown on a first display (not shown), while a window 210 for requesting expert assistance may be shown on a second display. The graphical user interface 210 may include a video window 212, such as a window for streaming video related to the gaming application for which assistance is being requested. For example, a user may stream a tip video in the video window 212 for providing gaming assistance. The graphical user interface window 210 may further include a wiki window 214 including written tips and guides for the gaming application for which assistance is being requested. A video suggestion window 218 may recommend additional videos related to the gaming application that may be helpful to the user. An expert request window 216 may include an option for requesting expert assistance. The expert request window may further include an indication of a number of experts currently available with expertise related to the gaming application and indications of one or more example expert profiles. In some embodiments, a user interface for expert selection may be displayed and requests for gaming assistance may be received even when a user's information handling system is not executing a gaming application. In such embodiments, a game for which assistance is being requested may be determined based on videos being viewed by the user regarding the gaming application, searches entered by the user related to the gaming application, wikis viewed by the user related to the gaming application, and other indicators of a particular gaming application. In such embodiments, upon initiation of a gaming assistance session, the user's information handling system may automatically initiate the gaming application as well.

Figure 2C:
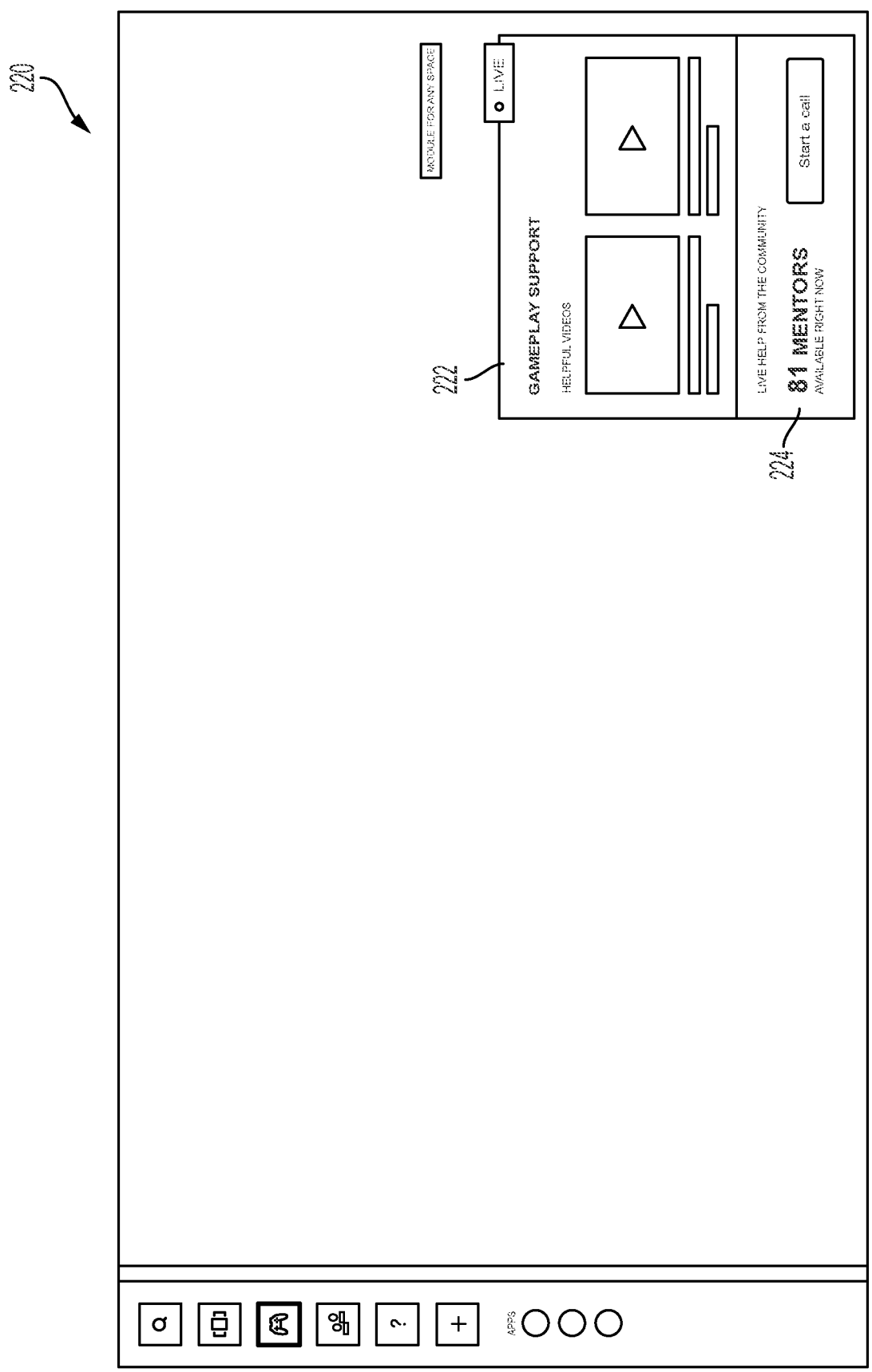
FIG. 2C is a third example layout of a user interface for facilitating connection between users and gaming experts according to some embodiments of the disclosure.

Another example graphical user interface 220, shown in FIG. 2C, may include a pop-up or overlay suggestion window 222. For example, an application or background service for connecting users may overlay the window 222 or cause the window 222 to pop up when the user opens a search engine and searches for assistance with the gaming application. The window 222 may include an option for requesting gaming assistance and may indicate a number of available gaming experts, along with suggested videos that may provide assistance with the gaming application.

Figure 2D:
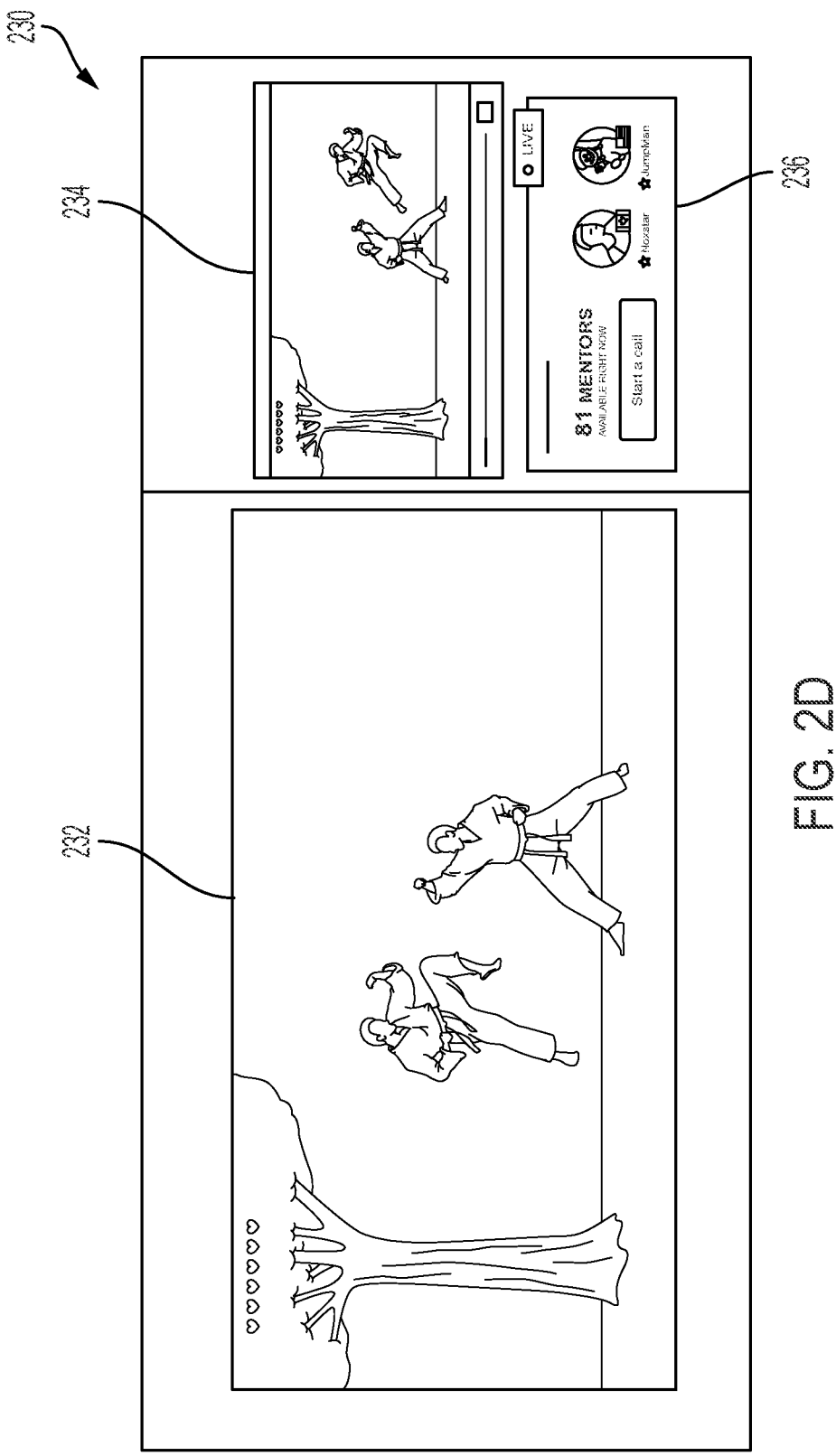
FIG. 2D is a fourth example layout of a user interface for facilitating connection between users and gaming experts according to some embodiments of the disclosure.

As another example, a graphical user interface 230 for facilitating connection between users and gaming experts, shown in FIG. 2D, may include a window of the gaming application 232 alongside one or more additional windows, such as in a picture-in-picture mode. For example, the gaming application be displayed in the window 232 on part of a display of the user's information handling system while a video window 234, such as a video window for displaying videos for providing assistance with the gaming application may be displayed alongside the gaming window 232. Additionally, an expert assistance window 236 may also be displayed to facilitate connection between users and experts. The expert assistance window 236 may include a button for selection by the user to request expert assistance as well as indicators of one or more available experts and an indicator of a number of currently available experts. In some embodiments, the expert assistance window 236 and the video window 234 may be overlaid on the gaming application window 232 such as using an additional application or background service. Thus, a variety of user interface options may be used to connect users with gaming experts when requested.

Upon a request for gaming assistance, a user of the information handling system 102 may be provided with a determined recommendation of one or more expert gamers capable of providing gaming assistance in a gaming application. Such a recommendation may, for example, be determined by the remote server 104.

Figure 3A:
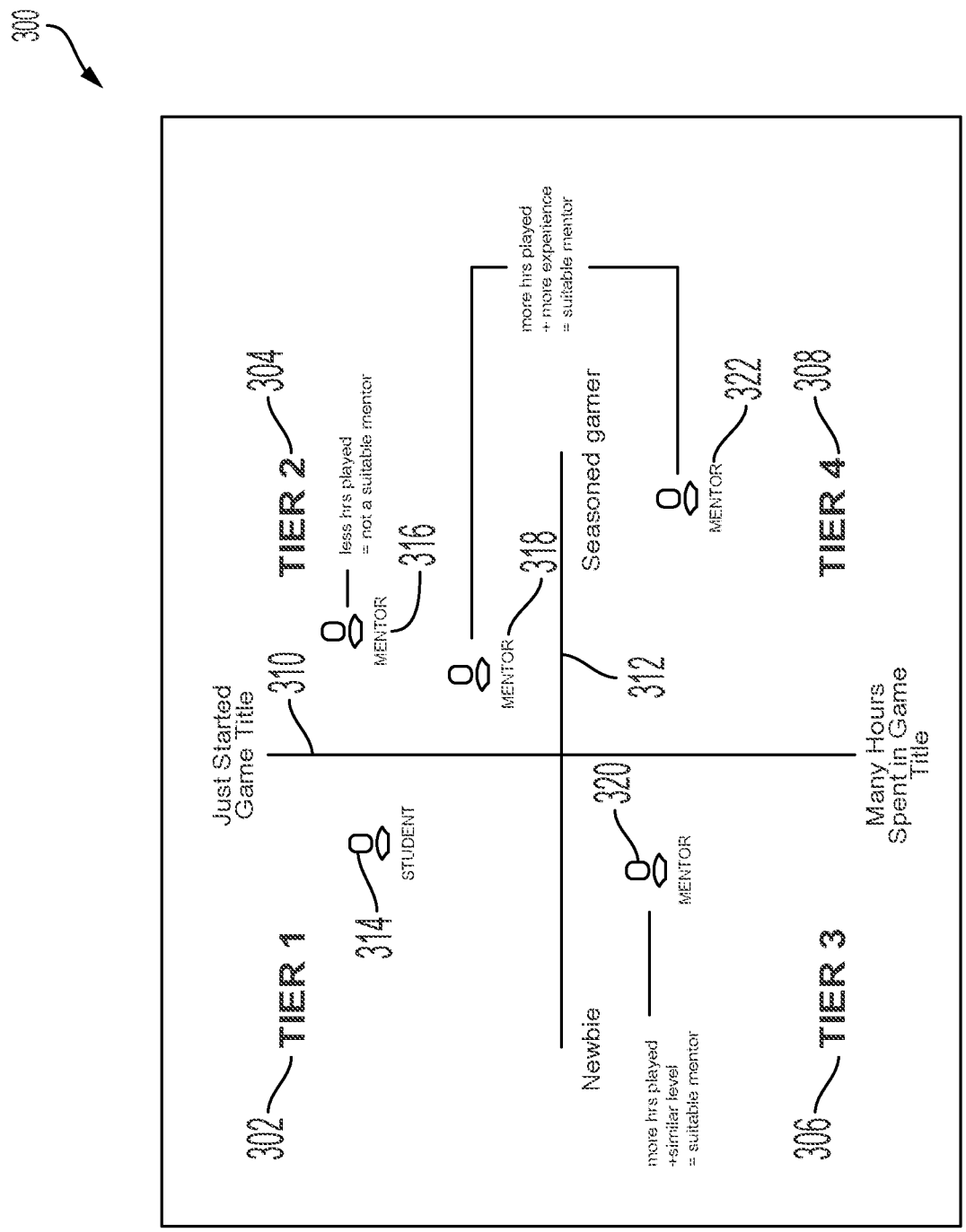
FIG. 3A is an example graph for comparison of gaming characteristics of available experts with gaming characteristics of an inexperienced user requesting assistance with a gaming application according to some embodiments of the disclosure.

Connection of users with gaming experts by a user's information handling system or by a remote information handling system may be based on a variety of gaming characteristics of the experts and/or the user. For example, users may be matched with experts indicated to be best able to provide assistance based on gaming characteristics of the user and the expert. Gaming characteristics may include a variety of user and expert attributes. For example, one gaming characteristic may be a level of expertise in a particular gaming application. A level of expertise in a particular gaming application may be determined based on an amount of time spent playing the particular gaming application, a level of completion of the gaming application, attainment of certain achievements related to the gaming application, gaming statistics in the gaming application, such as a kill to death ratio in a first person shooter, speed run records of the expert or user in the gaming application, and other indicators of a level of expertise in the gaming application. Likewise, gaming characteristics of users and experts may also include levels of expertise in a particular genre of gaming applications and a level of expertise in gaming in general, which may be determined based on similar statistics. For example, a level of expertise in first person shooter games may be determined by combined kill to death ratios or win/loss across multiple first person shooters. In some embodiments, a level of expertise of a user or gaming expert with respect to a particular gaming application may be determined based on a combination of levels of expertise of the user or expert in the particular gaming application, in gaming applications sharing a genre with the gaming application, and in gaming in general. Other gaming characteristics may include a play style, such as a preference for co-op play, competitive gaming, platformers, multiplayer gaming, speed running, strategy games, 100% completion of games, creative gameplay, all around gameplay, and other playstyles, age, language, personality characteristics, preferred gaming role, such as sniper, tank, damage per second, healer, or other gaming role, communication style, location, and other gaming characteristics. An example graph showing one methodology for connecting users with gaming experts when gaming assistance is requested is shown in FIG. 3A. The graph 300 shown in FIG. 3A shows use of experience in a particular gaming application for which assistance is requested, shown by axis 310, and general gaming experience, shown by axis 312, to select experts from a plurality of available experts for recommendation to a user for a gaming assistance session.

As shown in FIG. 3A, general gaming experience 312 may range from "newbie" with little gaming experience on the left to "seasoned gamer" with substantial gaming experience on the right. Gaming experience in a specific gaming application 310 may range from having just started a title, or gaming application, at the top to many hours spent in the gaming application, at the bottom. Alternatively or additionally, expertise in a gaming application and gaming in general may be gauged by other gaming attributes as discussed herein. The two axis 310, 312 may separate gaming experts and users into four tiers. A first tier 302 may include experts and users with little experience in gaming in general and in the particular gaming application. A second tier 304 may include experts and users having substantial gaming experience or experience in a particular gaming genre but little experience in the particular gaming application for which assistance is requested. A third tier 306 may include experts and users having substantial experience in the gaming application for which assistance is requested, but comparatively little experience in gaming in general or in the genre of the particular gaming application. A fourth tier 308 may include experts and users having substantial experience in both the particular gaming application for which assistance is requested and in gaming in general or in gaming applications sharing a genre with the gaming application for which assistance is requested.

As shown in FIG. 3A, a user 314, who may be referred to as a student, may request assistance with a particular gaming application. An information handling system, such as the information handling system 102 or the intermediary information handling system 104 of FIG. 1, may receive such a request and may determine a plurality of potential experts 316-322, or "mentors," that are available. A recommendation of one or more experts from a plurality of available experts may then be determined. Such a recommendation may be determined based on gaming characteristics of the available experts 316-322 and the user 314. For example, experts with a high level of expertise in the gaming application or in gaming in general may be preferred over experts with little experience in the gaming application or in gaming in general. Furthermore, experts with a level of expertise lower than the user may be blocked from inclusion in the recommendation of available experts. For example, an available expert 316 that has more experience than the user 314 in gaming in general but less experience than the user in the particular gaming application for which assistance is requested may not be included in the recommendation of available experts. On the other hand, an expert with more experience in the particular gaming application but less experience in gaming in general may be recommended. Furthermore, experts 318, 322 with more experience in gaming in general and in the particular gaming application may be recommended. Additional gaming characteristics, such as age, language, location, gaming style, personality characteristics, and other gaming characteristics may be used to determine experts for recommendation from a list of available experts.

Figure 3B:
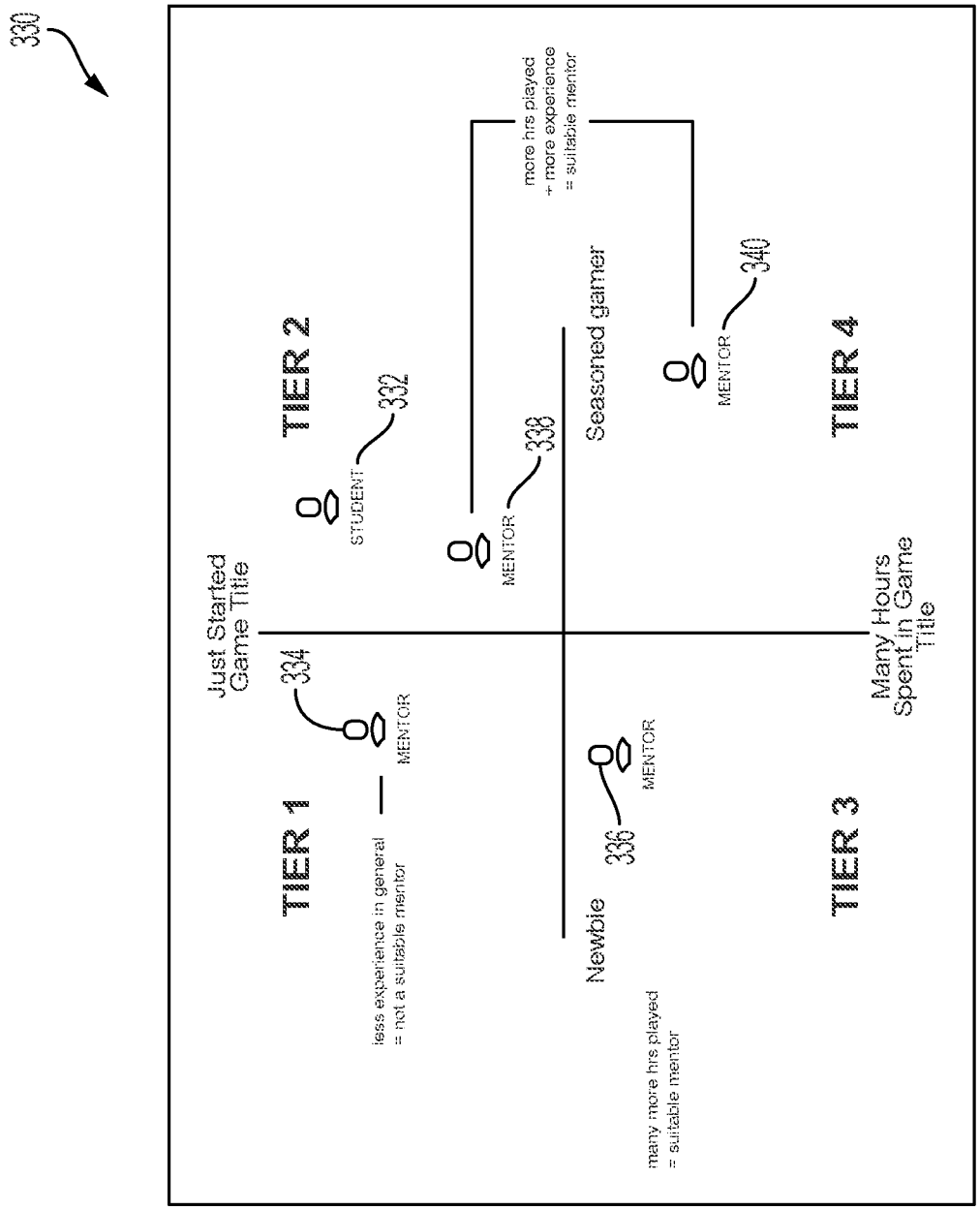
FIG. 3B is an example graph for comparison of gaming characteristics of available experts with gaming characteristics of a moderately experienced user requesting assistance with a gaming application according to some embodiments of the disclosure.

As shown in the graph 330 of FIG. 3B, a user with a different level of gaming experience may result in different determinations of expert recommendations. For example, the user 332 requesting assistance in a particular gaming application may have substantial experience in gaming in general but little experience in the gaming application for which assistance is requested. An expert 334 having substantially less experience in gaming in general but slightly more experience in the particular gaming application may not be included in the recommendation of experts. Experts 336, 338, 340, having varying levels of experience in the particular gaming application beyond the user 332 requesting assistance and varying levels of experience in gaming in general, may be recommended to the user 332.

Figure 3C:
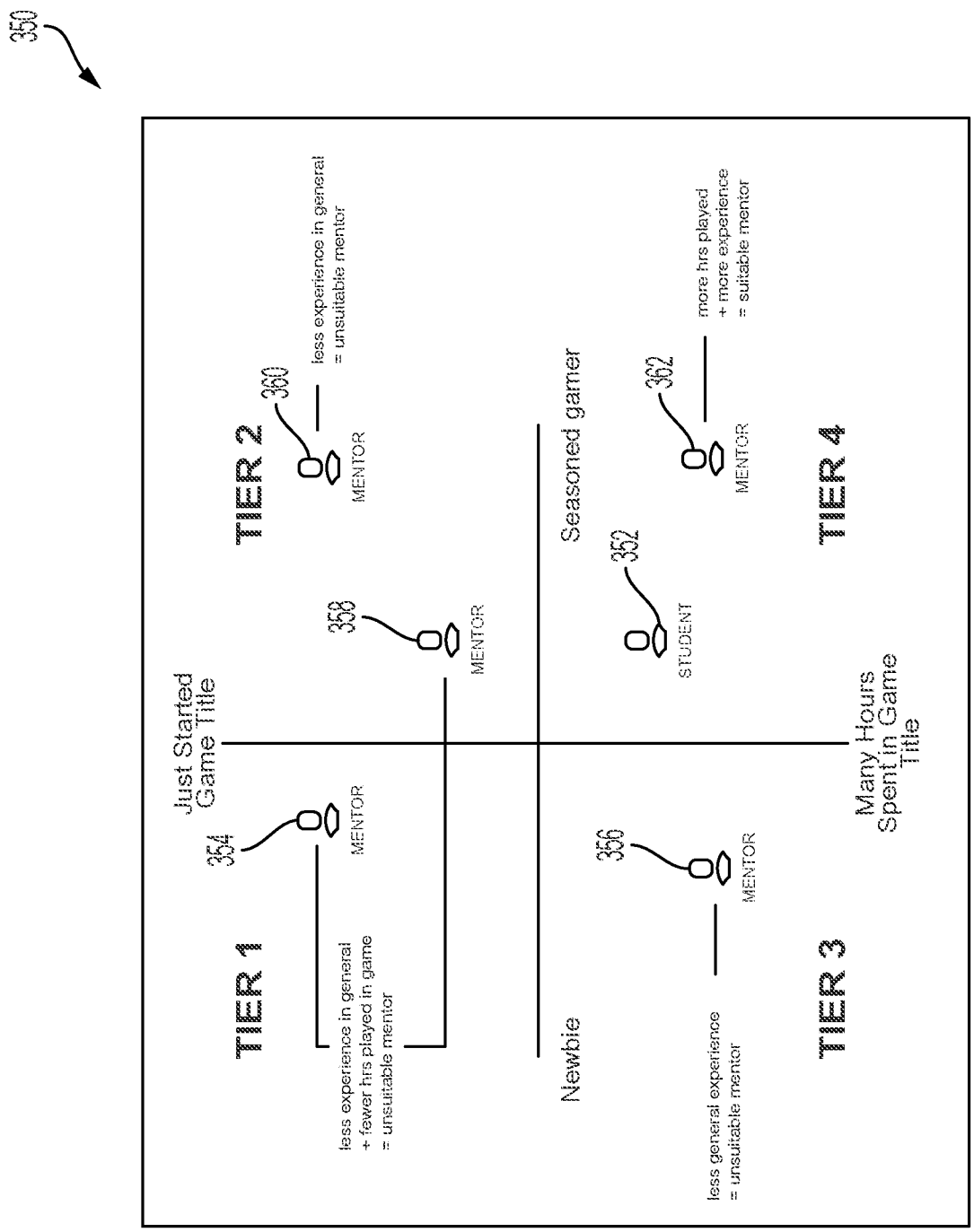
FIG. 3C is an example graph for comparison of gaming characteristics of available experts with gaming characteristics of an experienced user requesting assistance with a gaming application according to some embodiments of the disclosure.

As shown in the graph 350 of FIG. 3C, fewer experts may be recommended to a user 352 having substantial general gaming experience and substantial experience in the particular gaming application for which assistance is being requested. For example, available experts 354, 356, 358, and 360 may all have varying lower levels of general gaming experience and/or experience in the particular gaming application than the user 352 requesting assistance. For example, expert 356 may have slightly more experience in the particular gaming application than the user 352 but substantially less experience in gaming in general than the user 352. Thus, in some embodiments, experts may not be included in a recommendation of available experts even if they have slightly more experience in the particular gaming application for which assistance is being requested, if such experts have substantially less gaming experience in general. Other factors, such as age, may also be used to filter experts. For example, only experts having a similar age to the user 352 may be recommended. In some embodiments, standards for recommendation of experts may be adjusted based on a number of available experts that meet criteria for recommendation of experts. For example, if no experts are available that meet criteria for recommendation, criteria, such as a required level of experience, may be lowered to obtain more available experts for recommendation. In FIG. 3C, only a single expert 362 may have sufficient experience in gaming in general and in the gaming application for recommendation to the user 352. Thus, experts may be recommended to a user following a request for recommendation of experts based on gaming characteristics of the experts and, in some embodiments, gaming characteristics of the user.

In some embodiments, the user of the information handling system 102, of FIG. 1, may select one or more recommended experts with which the user would like to establish a gaming assistance session. Establishment of a gaming assistance connection may include connecting the information handling system 102 of the user to an information handling system of an expert, such as information handling system 106, either directly, or indirectly via the remote server 104. For example, the information handling system 102 may transmit a request for establishment of a gaming assistance session to the server 104, and the server 104 may transmit a request for establishment of such a session to the expert's information handling system 106. The expert's information handling system 106 may transmit an acceptance of the request to the server 104, and the server 104 may act as an intermediary information handling system during the gaming assistance session, transmitting information to and receiving information from the user's information handling system 102 and the expert's information handling system 106. In other embodiments a direct connection may be established between the user's information handling system 102 and the expert's information handling system.

A user may select one or more experts for connection in a gaming assistance session following determination of a recommendation of experts, or a gaming assistance session may be automatically initiated based on the recommendation of available experts. Gaming assistance sessions between a user's information handling system 102, shown in FIG. 1, and an expert's information handling system 106 may include transmission and reception of text, video, audio, input data, and other data. In some embodiments, multiple users requesting assistance may be connected with one or more experts. In other embodiments, multiple experts may be connected with a single user requesting assistance. In a gaming assistance session, a user and an expert may communicate via audio, video, and/or text chat. In some embodiments video data, such as video data generated by a graphics card of the user's information handling system 102 for the gaming application may be captured and may be transmitted to the expert's information handling system 106. Such video data may be streamed real-time for analysis by the expert. Furthermore, audio data generated for the gaming application of the user's information handling system may also be transmitted in real-time to the expert's information handling system.

Figure 4A:
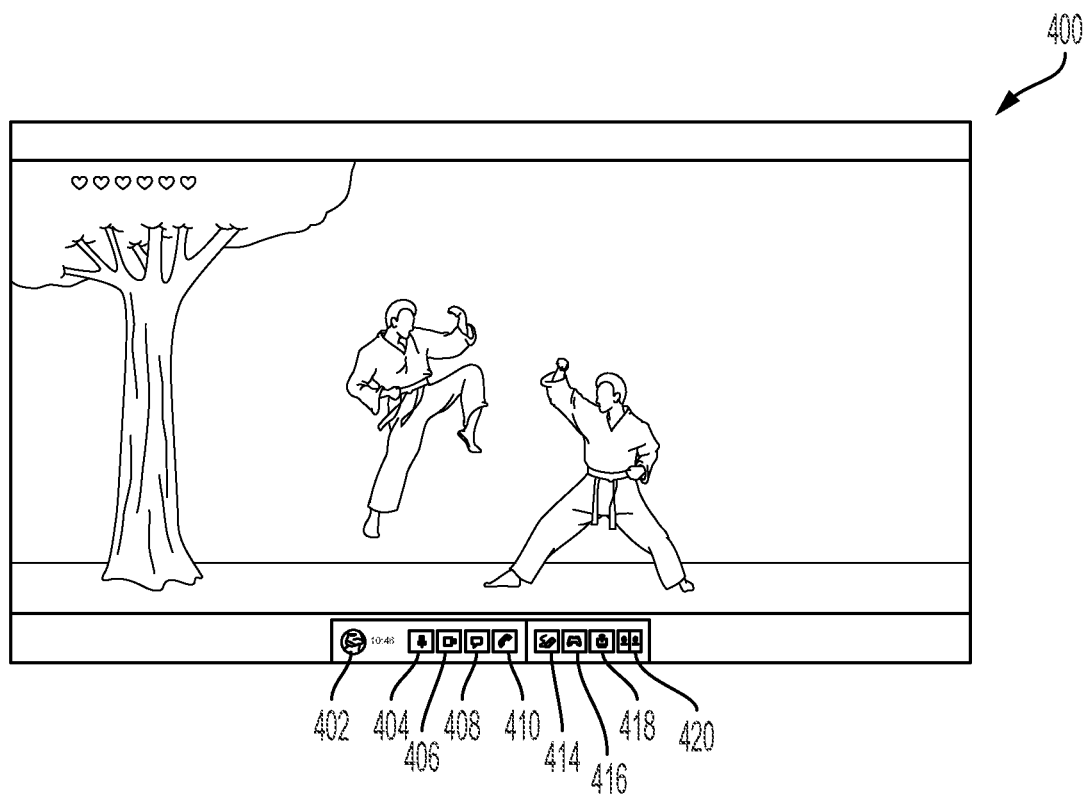
FIG. 4A is an example layout of a user interface for a gaming assistance session including voice chat according to some embodiments of the disclosure.

An example user interface 400 for a gaming assistance session, is shown in FIG. 4A. As shown in FIG. 4A, a display of the user's information handling system may present a gaming application. The display of the gaming application may also include an overlay or pop up of a control bar for the gaming assistance session. For example, the bar 402 may include a profile image/avatar of an expert to which the user is connected, which may be highlighted in green to indicate that the expert is online or available, a time spent in a gaming assistance session, such as an amount of time spent in a voice chat or game streaming session, a microphone button 404 for muting or unmuting an audio connection with the expert, a video button 406 for turning a video chat connection with the expert on and off, a chat button 408 for displaying, hiding, initializing, or terminating a text chat session between the expert and the user, an end session button 410 for ending the gaming assistance session, a draw button 414 to allow the user to draw using a touch input or mouse to indicate particular portions of the display of the gaming application to the expert, a control display button 416 to trigger display and/or transmission of control inputs, such as by a keyboard, a mouse, or a gamepad, connected to the expert's or user's information handling system, a control input display button, to trigger display of inputs using an input device by the user and/or the expert, a share controls button 418 to allow the user to pass control of a gaming application executed by the user's information handling system to a gaming expert, and play side by side button 420, to initiate a side by side gaming session, as discussed with respect to FIG. 5C. A similar control bar 402 may be displayed on a display of the expert's information handling system along with streamed video of the gaming application from the user's information handling system. The display of the user's information handling system may also display streamed video of the gaming application, when executed by the expert's information handling system, to allow the user to observe the expert playing the gaming application. Thus, the user may engage in a voice chat with the expert during the gaming assistance session, and a user interface may be provided to allow the user and the expert to communicate in various ways.

Figure 4B:
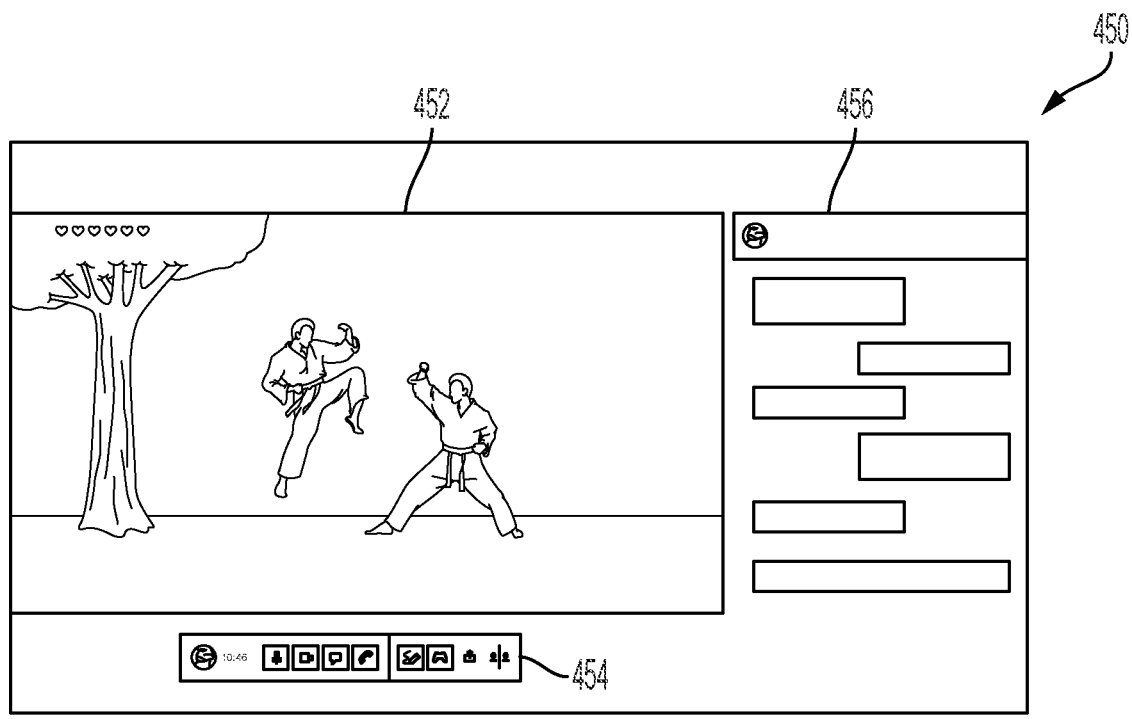
FIG. 4B is an example layout of a user interface for a gaming assistance session including text chat according to some embodiments of the disclosure.

An example user interface 450 including a text chat between the user and the expert is shown in FIG. 4B. The user interface may include a display of the gaming application 452, along with a text chat box 456 for text chat between the user and the expert. The user interface 450 may also include a similar control bar 454 to the control bar 402 of FIG. 4A. Such a user interface 450 may be displayed by the user's information handling system and by the expert's information handling system.

A gaming assistance session between the user and the expert may allow the user and the expert to engage in various forms of communication. For example, an expert may input indicators on a display of gaming video received from the user's information handling system using a mouse and keyboard, gamepad, or other input device connected to the expert's information handling system. For example, the expert's information handling system may receive and display video from the gaming application executed by the user's information handling system. The expert may provide pointers or advice to the user by drawing or clicking on portions of the video from the gaming application, or an image of the video from the gaming application, received from the user's information handling system. Such input from the expert's information handling system is an example of gaming overlay input data and may be transmitted to the user's information handling system and overlaid, by the user's information handling system, on the gaming application window. In some embodiments, a user's information handling system, such as information handling system 102 may record and transmit indications of user input, such as user input information, from one or more attached input devices, such as a keyboard, mouse, gamepad, or other input device, to an information handling system of the expert 106. The expert's information handling system 106 may display the received input data alongside streamed gaming application video data to allow the expert to analyze the user's input as it related to the gaming application. Expert input data may similarly be transmitted to and displayed by the user's information handling system to allow the expert to suggest inputs to the user.

Figure 5A:
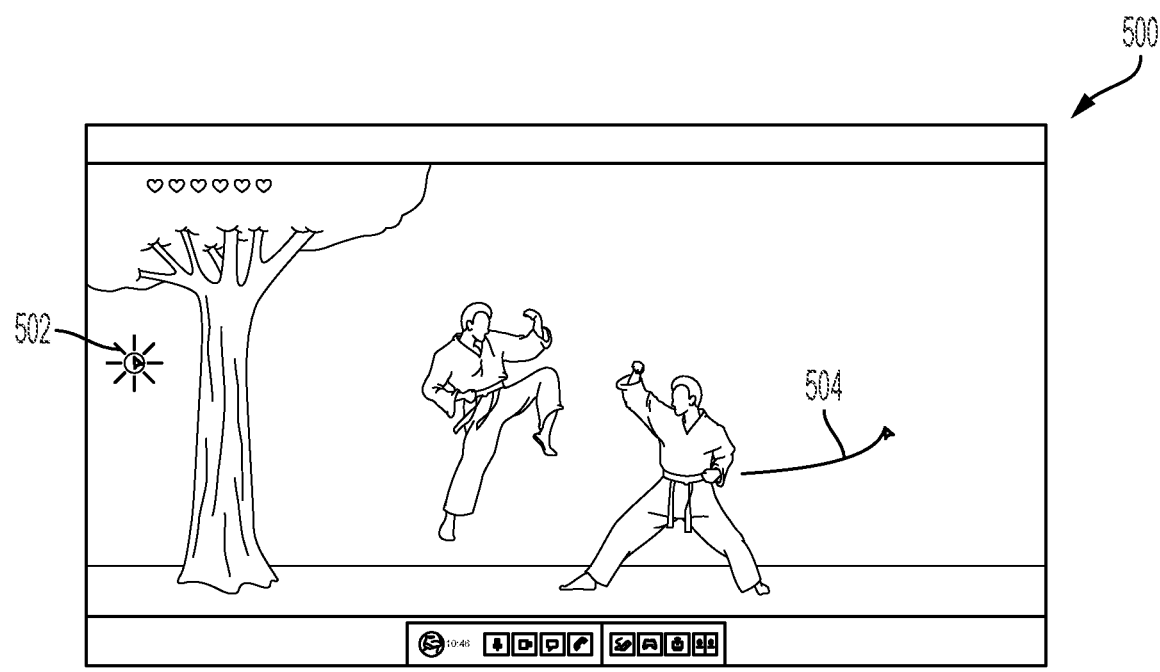
FIG. 5A is an example layout of a user interface including a display of gaming overlay input according to some embodiments of the disclosure.

An example user interface 500 including display of gaming overlay input data, such as selection and/or drawing input information, is shown in FIG. 5A. An indication of the selection may be transmitted to the user's information handling system, and an indication 502, of the selection, may be overlaid on the gaming application window of the user's information handling system. Likewise, the expert may draw on the gaming video window, and an indication 504 of the drawing may be transmitted to and displayed by the user's information handling system in the gaming application window. In some embodiments, the drawing data from the user's information handling system may be sent to and displayed by the expert's information handling system in a similar way. Selection and drawing information may be referred to as gaming overlay input information.

Figure 5B:
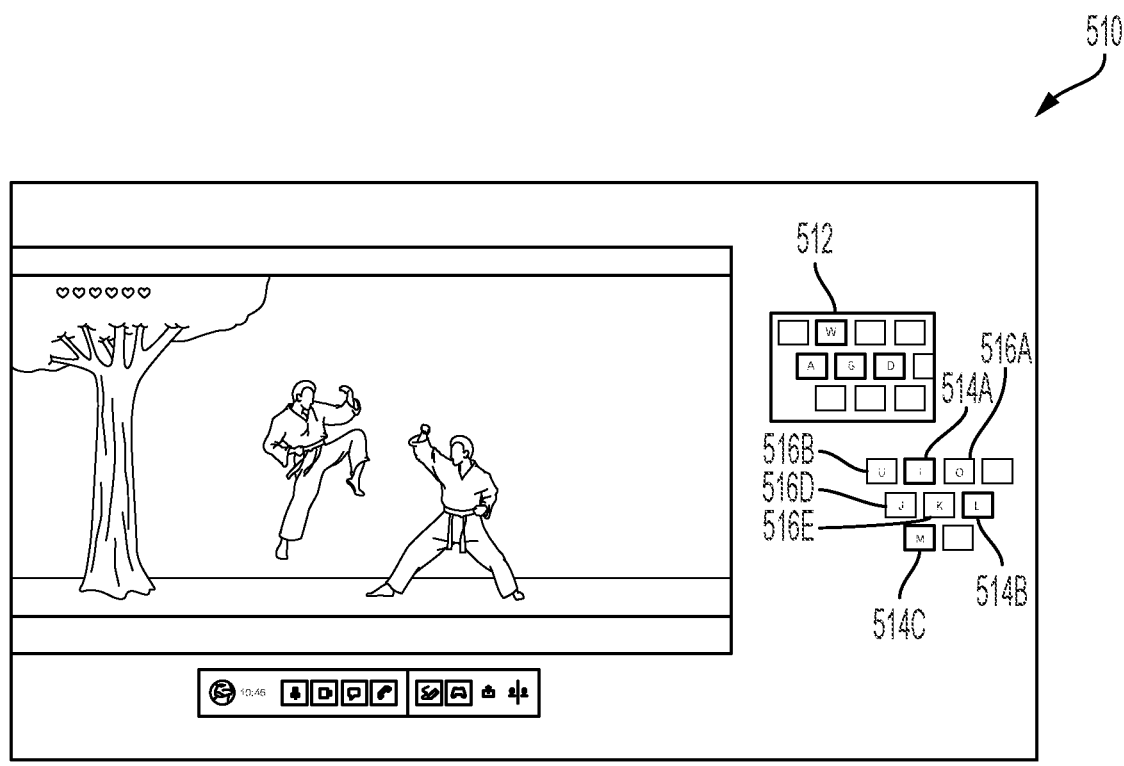
FIG. 5B is an example layout of a user interface including a display of keyboard input according to some embodiments of the disclosure.

Mouse and keyboard input may also be transmitted between users and experts for display. An example user interface 510 for display of keyboard input is shown in FIG. 5B. The user interface may include keyboard input indicators 512, 514A-C, 516A-D alongside a window of the gaming application. For example, the user interface 510 may be a user interface of an expert connected in a gaming assistance session with a user. The gaming application window may display real-time streamed video of the gaming application. An information handling system of the user may transmit both video and audio data associated with the gaming application and user input data from one or more input devices, such as a keyboard, mouse, and/or gamepad. The input data may be displayed real-time alongside the streamed video data. For example, directional keys 512 on the expert's display may be highlighted whenever a user selects them. Likewise, various other highlighted key inputs 514A-C may indicate that a user has selected the inputs, while non-highlighted inputs 516A-E may indicate that the user has not selected the inputs. Likewise, the user interface 510 may be a user interface of a user observing an expert's gaming video stream and/or keyboard inputs. As one example, the gaming window may display the gaming application on the user's information handling system, and the input indicators 512, 514A-C, 516A-D may display recommended inputs transmitted from the expert's information handling system. In addition to keyboard input, a user interface may display gamepad input and/or mouse input from a user or expert. Such input data may allow a user or expert to observe the timing of input as it relates to the gaming application.

Figure 5C:
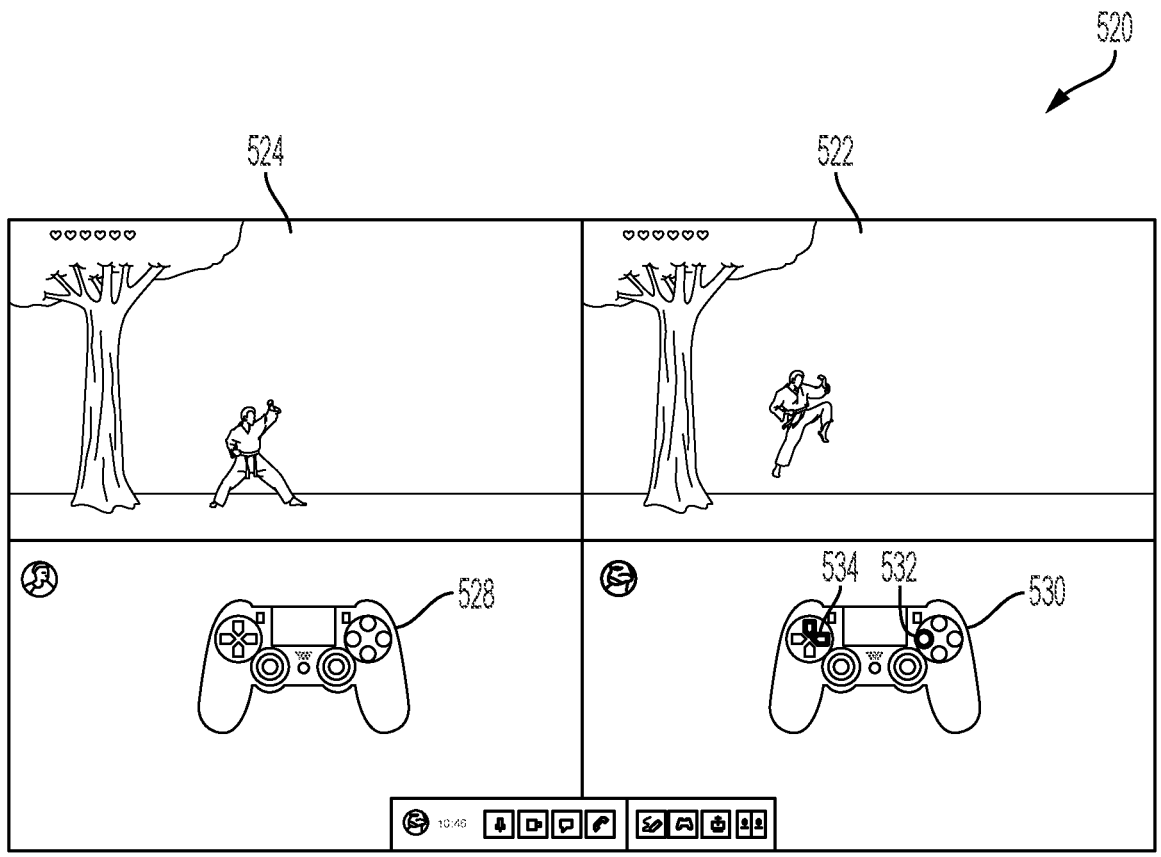
FIG. 5C is an example layout of a user interface including gamepad input and shared video according to some embodiments of the disclosure.

In some gaming assistance sessions, video of the gaming application for the user and the expert may be displayed alongside each other, as in user interface 520 of FIG. 5C. For example, a first gaming application window 520 may display the gaming application executed by the user's information handling system, while a second gaming application window 522 may display the gaming application executed by the expert's information handling system. Such side-by-side display can allow a user to play through a difficult portion of a gaming application alongside an expert. For example, the gaming application may be executed on both an information handling system of the user and an information handling system of the expert. Video and/or audio data of the gaming application on each information handling system may be transmitted to the other information handling system. Thus, the user's gaming application and video of the expert's gaming application may be displayed side by side on a display connected to the user's information handling system, and the expert's gaming application and video of the user's gaming application may be displayed side by side on a display connected to the expert's information handling system.

FIG. 5C also includes example gamepad input displays 528, 530. For example, when not displayed side by side a single gamepad 528 may be displayed underneath a gaming application window or a gaming application streaming video window and may be adjusted to highlight inputs that are selected or activated. When gaming application data from the user/expert and gaming application video streaming data from the other of the user/expert are displayed side by side, gamepad outlines 528, 530 may be displayed beneath each gaming application window. When a user selects an input, such as the up and right direction pad buttons 534 or the square button 532, the input may be highlighted. Thus, both a user and an expert may play side-by side and observe inputs entered by the other party to the gaming assistance session. In some embodiments, the user's information handling system may stream video and audio data from the gaming application along with input data to the expert's information handling system, while the expert's information handling system may transmit video and audio data from the gaming application along with input data to the user's information handling system simultaneously. Thus, a user may be able to observe an expert's gameplay in real time, along with the expert's input, while the user attempts the same portion of the game alongside the expert, even if the game is not a traditional co-op experience.

Figure 6:
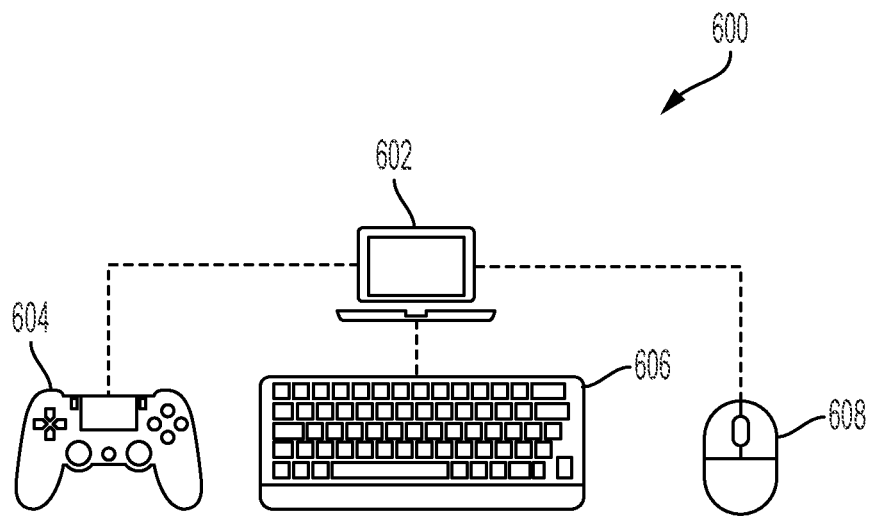
FIG. 6 is an example layout of an information handling system connected to a plurality of input devices according to some embodiments of the disclosure.

Information handling systems may be connected to a variety of input devices, and data indicating inputs entered using the input devices may be transmitted to other information handling systems participating in a gaming assistance session. An example layout 600 of an information handling system 602 connected to a gamepad 604, a keyboard 606, and a mouse 608, is shown in FIG. 6. As discussed herein, during a gaming assistance session between a user and an expert gamer, the information handling system 602 may transmit indications of input data received via peripherals, such as gamepad 604, keyboard 606, and mouse 608, to another information handling system participating in the gaming assistance session. In some embodiments, an information handling system, such as information handling system 602, may provide a user with indications of received input data via means other than or in addition to display of such input data on a display of the information handling system. For example, when an information handling system 602 of a user receives an indication of key input on a keyboard by an expert from the expert's information handling system, the information handling system 602 may cause corresponding keys of the keyboard 606 to be illuminated. Similarly, a mouse button of the mouse 608 corresponding to a mouse button indicated by received input indication information may be illuminated. Alternatively or additionally, received input information may be indicated by the information handling system 602 by triggering haptic feedback of the controller 604. For example, the expert gamer's information handling system may provide the gaming expert with an option for triggering haptic feedback in a gamepad 604 connected to the user's information handling system 602. When the expert selects an input to trigger such haptic feedback, an indication of the input may be transmitted from the expert's information handling system to the user's information handling system 602. The user's information handling system may trigger haptic feedback in the gamepad 604 based on the received indication. Thus, received input information may be indicated to a user by haptic feedback, illumination, and other means, in addition to being displayed on a display of the information handling system 602.

Figure 7:
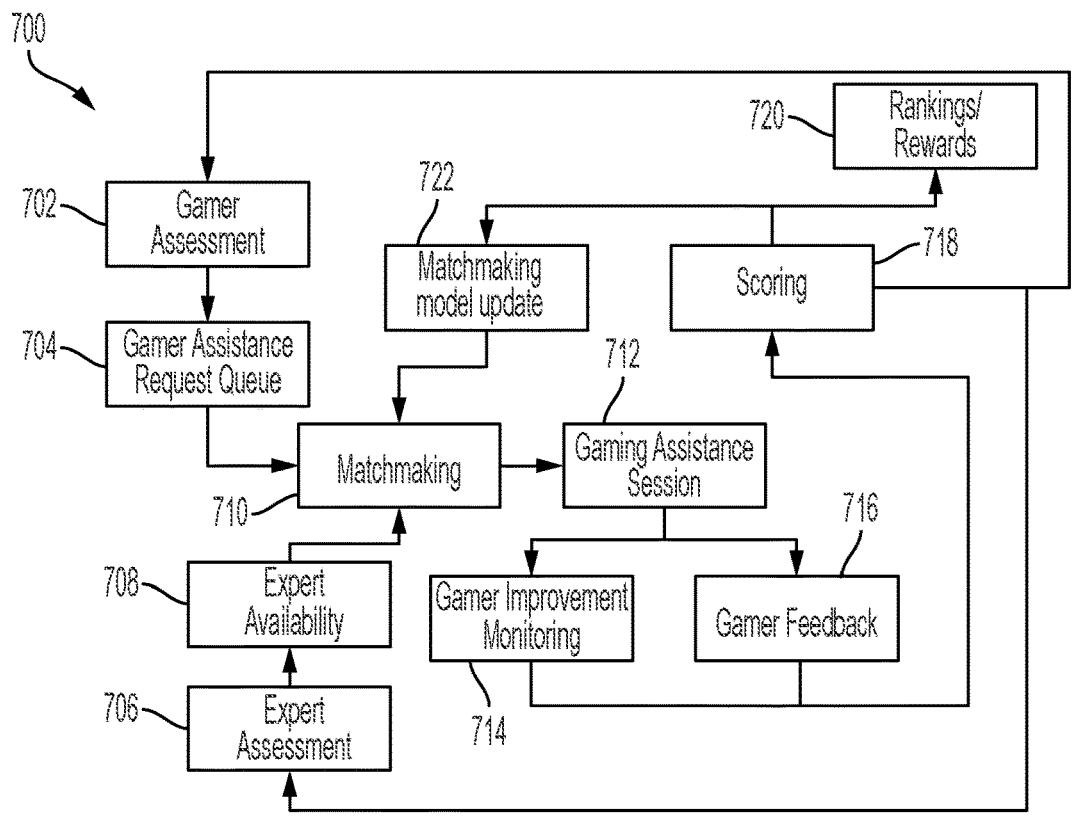
FIG. 7 is a block diagram of an example system for connecting users with gaming experts for gaming assistance according to some embodiments of the disclosure.

A system 700 for facilitating connection of gamers, such as users operating information handling systems to execute gaming applications, with gaming experts, shown in FIG. 7, may be executed by one or more users' information handling systems, one or more experts' information handling systems, by one or more intermediary information handling systems, such as cloud-based servers, or by a combination of the aforementioned information handling systems. In some embodiments, the system 700 may be executed entirely by remote cloud-based servers for facilitating connection between gamers and experts. The system 700 may, for example, be executed by one or more processors of one or more information handling systems and data related to the system 700 may be stored in one or more memories of one or more information handling systems.

A matchmaking function 710 of the system 700 may connect users with gaming experts for a gaming assistance session, also referred to herein as a mentoring session. The matchmaking function 710 may connect gamers with gaming experts based on gaming characteristics of the gaming experts and/or the garners. For example, the system 700 may perform a garner assessment 702 on a garner to determine one or more gaming characteristics of the garner, such as a level of experience or skill of the garner. In some embodiments, such an assessment may include determining an amount of time the garner has spent playing a particular game, determining an amount of time the garner has spent playing games of a particular genre, determining an amount of time the garner has spent gaming in general, determining the gamer's level of completion of a particular game, determining the gamer's level of completion of other games, such as games having a particular genre, determining a gamer's gaming statistics, such as kill to death ratio, speed run timing records, or win/loss record, and other factors indicative of a gamer's skill or experience level. The garner assessment module 702 may assign a garner one or more gaming characteristics based on the assessment, such as one or more skill levels. The garner assessment module 702 may also determine other gaming characteristics of the garner, such as an age of the garner, a language of the garner, a gaming style of the garner, personality characteristics of the garner, and other attributes of the garner. In some embodiments, the system 700 may assess gaming characteristics of multiple garners.

A garner assistance request queue module 704 may receive a request for assistance with a gaming application from the garner. For example, a garner may provide a voice command, select, or otherwise enter a request for assistance associated with a particular gaming application, such as a gaming application currently being executed by an information handling system of the garner. In some embodiments, the system 700 may receive multiple requests for assistance from a single gamer or multiple requests for assistance from multiple gamers. The gaming characteristics of the gamer determined by the gamer assessment module 702 and the gaming assistance request received by the gamer assistance request queue module 704 may be passed to the matchmaking module 710 for connecting the gamer with one or more experts capable of providing assistance with the gaming application for which assistance was requested.

In determining one or more experts to recommend to the gamer requesting assistance, the matchmaking module may use one or more gaming characteristics of the experts determined by an expert assessment module 706. For example, a user of an information handling system may volunteer to provide assistance in gaming assistance sessions, and the system 700 may determine gaming characteristics of the user to verify that the user qualifies as an expert. The expert assessment module 706 may function similarly to the gamer assessment module 702 to determine gaming characteristics of an expert, such as a skill level of an expert, an age of an expert, a language of an expert, a play style of an expert, and other gaming characteristics of an expert. The expert assessment module 706 may, for example, determine if gaming characteristics of a gamer indicate that the gamer meets certain thresholds of expertise, such as a certain amount of time spent gaming in general or playing a particular gaming application. In some embodiments, the expert assessment module 706 may provide one or more goals for the user to achieve before the user qualifies as an expert. For example, the expert assessment module may require the user to attain certain achievements or gameplay statistics in order to qualify as an expert for recommendation for gaming assistance. Once a user is determined to qualify as an expert, the expert assessment module 706 may record the user as an expert and may also record gaming characteristics associated with the expert. The expert may then be included by the matchmaking module 710 in lists of recommended experts. In some embodiments, the expert assessment module 706 may search for gaming experts for new gaming applications based on performance of gaming experts with respect to old gaming applications of a similar genre and may provide a notification to gamers of potential expert status qualification. In some embodiments, an expert status may be assigned by the expert assessment module based on an in-game title obtained by an expert, a preferred role played by an expert in gaming applications, and/or a preferred subdomain of the expert.

In some embodiments, the expert assistance module may use self-reporting in addition to gaming data to determine gaming characteristics of the expert. For example, the expert assessment module 706 may receive a reported level of gaming expertise from an expert and may verify the level of gaming expertise reported by the expert using gaming data such as statistical data regarding the expert's gaming performance. In some embodiments, gaming characteristics of a user may be determined, verified, and/or otherwise analyzed using video and audio learning to record and analyze a user's in-game performance.

An expert availability module 708 may receive an availability indicator from an expert. For example, the expert availability module 708 may mark an expert as not available when an expert is offline or in the middle of another gaming session. Alternatively or additionally, the expert availability module 708 may receive input from an expert regarding the expert's availability and may set an availability of the expert based on such received input.

The matchmaking module 710 may receive expert availability statuses from the expert availability module 708 and expert gaming characteristics from the expert assessment module 706. Having received gaming characteristics of one or more available experts and gaming characteristics of a gamer requesting assistance with a gaming application, the matchmaking module 710 may determine a recommendation of one or more experts for the gamer requesting assistance. Such a determination may be made based on gaming characteristics of available experts and/or gaming characteristics of the gamer requesting assistance. As one example, a gamer may request speed run assistance with a particular gaming application. The matchmaking module 710 may compare speed run statistics of the gamer related to the gaming application with speed run statistics of one or more available experts related to the gaming application. The matchmaking module 710 may recommend one or more gaming experts to the gamer who have speed run statistics related to the gaming application that are superior to speed run statistics of the gamer related to the gaming application.

A gaming assistance session module 712 may connect one or more gamers with one or more experts for a gaming assistance, or mentoring, session. A gaming assistance session may include, as described herein, gaming video sharing, a voice connection, text communication, sharing of input data, and other sharing to allow the gaming expert to provide the gamer with assistance. In some embodiments, the gaming assistance session module 712 may be executed by a remote server and may act as an intermediary between an information handling system of the gamer and an information handling system of the gaming expert. For example, the gaming assistance session module 712 may receive data from the gamer, such as gaming video and audio data, input data, voice data, text data, and other data, and may forward such data to an information handling system of the expert.

Likewise, the gaming assistance session module 712 may receive data from the expert and may forward such data to the information handling system of the gamer.

During the gaming assistance session and/or after the gaming assistance session is complete, a gamer improvement monitoring module 714 may monitor improvement of the gamer. Such monitoring may include monitoring gaming performance improvement of the gamer, such as making progression in gameplay, improved gaming statistics, and other gaming performance related improvements. The gamer improvement monitoring module 714 may also monitor a mood of a gamer. For example, the gamer improvement monitoring module 714 may monitor a happiness of a gamer following the gaming assistance session through voice data of the gamer or through other data. The gamer improvement monitoring module 714 may be executed by a gamer's information handling system, by a remote information handling system, or both.

During or following the gaming assistance session, a gamer feedback module 716 may also receive formal feedback from the gamer and/or gaming expert. Such feedback may include a thumbs up or thumbs down following the gaming assistance session, a rating provided by the gamer on a scale, and/or responses of the gamer to more complex survey questions. The gamer feedback module 716 may also include receipt of feedback from the gaming expert regarding the gamer, such as whether the gamer followed guidelines of the system 700 and a friendliness/respectfulness of the gamer.

A scoring module 718 may score the gamer and/or the gaming expert during and/or following the gaming assistance session. In addition, the scoring module may score the gaming assistance session itself, such as scoring a match between the gamer and the gaming expert. For example, the match may be scored based on a quality of the match, such as a matching of skill levels, gaming styles, and personalities of the participants that allow the gamer and gaming expert to work together. If the gamer and the gaming expert do not work well together, as indicated by a lack of improvement detected by the gamer improvement monitoring module 714 or personality, age, gender, or language mismatch issues detected by the gamer feedback module 716, the match may receive a low rating. However, if the gamer shows substantial improvement and/or the match receives positive feedback from the gamer and/or the expert, the match may receive a high rating. In some embodiments, the scoring module 718 may assign two or more ratings to the match, such as one rating based on improvements in the gamer's skill level and another based on the personality match between the gamer and the gaming expert. The gamer and the gaming expert may also be scored based on their skill levels. For example, a score may be assigned to both of the gamer and the gaming expert based on the gaming assistance session, such as improvements in the gamer's skill level and other aspects, and may be provided to the gamer assessment module 702 and/or the expert assessment module 706 to update one or more gaming characteristics of the gamer and the gaming expert, such as a skill level of the gamer and/or the gaming expert. In some embodiments, an expert may be assigned a gaming assistance score, rating the expert's ability to provide gaming assistance separate from the expert's gaming skill level. For example, an expert that consistently receives positive reviews from gamers with which the expert is paired may receive a high gaming assistance score and may be recommended more often to gamers requesting gaming assistance. Information from the gamer feedback module 716 may be provided to the expert assessment module 706 and the gamer assessment module 702 to update gaming characteristics of the gaming expert and the gamer. For example, a gamer may provide feedback as to an expert's personality, such as rating a patience of the expert, and such feedback may be used by the expert assessment module 706 to update a personality characteristic of the gaming expert. The scoring module 718 may also score a style of the gamer and the gaming expert, such as rating the gamer and gaming expert's preferred gaming style, such as whether the gamer and gaming expert prefer speed running games, longer or shorter gaming sessions, and other gaming-style related gaming characteristics. The scoring module 718 may score a rate of improvement of the gamer and forecast future improvements of the gamer. In some embodiments, the scoring module 718 may combine all of the aforementioned aspects of the match of the gamer and the gaming expert in an overall gaming match score based on the outcome of the match between the gaming expert and the gamer.

In some embodiments, multiple gamers and/or multiple experts may participate in a gaming assistance session. For example, a team of gamers may participate in a gaming assistance session related to a multiplayer gaming application with an expert. The scoring module 718 may provide individualized and team scoring in such circumstances, rating performance of both the team and the individual gamers.

In some embodiments, the scores assigned by the scoring module 718 may be provided to a rankings/rewards module 720. For example, experts may be ranked based on their skill level and/or helpfulness to gamers requesting assistance. An expert's ranking may be increased by the rankings/rewards module 720 based on a high score following a gaming assistance session or may be reduced by the rankings/rewards module 720 based on a low score following a gaming assistance session. The ranking of experts may be performed on a regional, global, or other scale. In some embodiments, experts may be ranked by a preferred role in a gaming application, a preferred title in a gaming application, or a preferred subdomain in a gaming application. For example, separate expert ranking leaderboards may be provided for experts with expertise as a damage per second role, healing role, or tank role in gaming applications. In some embodiments, the rankings/rewards module may assign rewards, such as points, to an expert based on scoring outcomes of a gaming assistance sessions. High scores from the scoring module 718, such as scores showing that the gamer's skill improved and/or that the gamer had a positive impression of the expert, may be provided to the ranking/rewards module 720 and a large number of points may be awarded the expert based on such scoring. Low scores may result in a lower reward. Such points may, for example, be redeemable to obtain titles, in-game items, discounts on gaming applications, and other rewards. In some embodiments, more rewards may be allocated to experts having higher levels of experience and/or skill than experts having lower levels of experience and/or skill. In some embodiments, rewards may be allocated to experts based on an amount of time spent in mentoring sessions.

The scoring module 718 may also provide scoring information to a matchmaking model update module 722. The matchmaking model update module 722 may update a matchmaking module 710, such as updating an algorithm for connecting gaming experts with gamers. For example, the matchmaking model update module 722 may apply machine learning algorithms to update the matchmaking module 710 algorithm based on outcomes of matches between experts and gamers. If matching gaming experts having certain gaming characteristics with gamers having certain gaming characteristics results in lower scored outcomes than matching of gaming experts having other gaming characteristics with gamers having other gaming characteristics, then the matchmaking model update module 722 may update the matchmaking algorithm to reduce the instances matching of experts and gamers having the certain gaming characteristics and increase the instances of matching of experts and gamers having the other gaming characteristics. For example, if matching of gamers having gaming characteristics indicating a more laid-back personality with experts having gaming characteristics indicating a more energetic personality results in poor outcomes from the scoring module 718, the matchmaking model update module 722 may update the matchmaking module 710 to reduce the instances of recommendation of such experts to such gamers. Therefore, a matchmaking algorithm of the matchmaking module 710 may be updated based on scoring outcomes of gaming assistance sessions.

Figure 8:
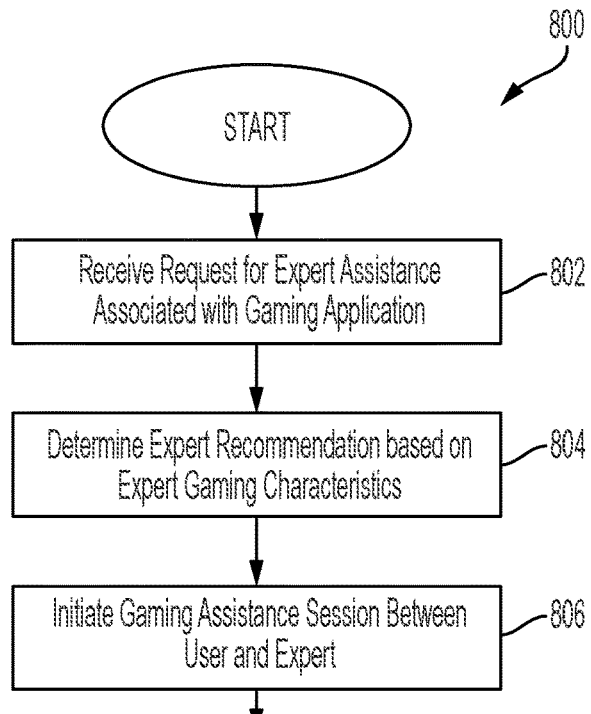
FIG. 8 is a flow chart of an example method for connecting a user with an expert for a gaming assistance session according to some embodiments of the disclosure.

An example method of pairing users with expert gamers for gaming assistance session is shown in FIG. 8. The method 800 may be performed by a user's information handling system, one or more intermediary information handling systems such as remote cloud-based server running the system 700 of FIG. 7, and/or by an information handling system of a gaming expert. The method 800 may begin, at step 802, with receipt of a request for expert assistance associated with a gaming application. For example, a user of an information handling system may encounter a difficult challenge in a gaming application and may select an option for requesting assistance, may make a voice request, or may otherwise request assistance with a gaming application. In some embodiments, such a request may be transmitted by the user's information handling system to a remote information handling system for processing. The request may, for example, be received while the user is playing a gaming application, viewing video content related to the gaming application, or viewing other content related to the gaming application, and the information handling system may determine that the request is associated with the gaming application based on activity of the user at the time the request is made.

At step 804, a recommendation of one or more experts from a plurality of available gaming experts may be determined based, at least in part, on one or more gaming characteristics of the one or more available experts and on the gaming application for which assistance is requested. For example, the information handling system may determine availability of gaming experts with expertise related to the gaming application based on availability status indicators of the experts. In some embodiments an expert may manually set or adjust an availability status indicator, while in other embodiments an availability status indicator of the gaming expert may be automatically adjusted based on activity of the gaming expert. In some embodiments, the recommendation may be further based on the gaming application for which expert assistance is requested. In some embodiments, the recommendation may be further based on gaming characteristics of the user in addition to gaming characteristics of the one or more available experts. Gaming characteristics may include gaming skill levels, personality traits, preferred gaming genres, preferred gaming styles, preferred gaming role, communication style, language skills, age, gender, culture, favorite gaming applications, and other gaming characteristics. In some embodiments, a user or expert may be provided with a list of gaming characteristics indicating gaming characteristics that may be possessed by a user or expert that the gamer would work well with. Such a list may be determined, for example, based on past outcomes of matches between gamers and gaming experts.

At step 806, a gaming assistance session may be initiated between the user requesting gaming assistance and one or more gaming experts. A gaming assistance session may be initiated automatically based on the determination of the one or more recommended experts or may be initiated based on a selection of a gaming expert, a request to establish a gaming assistance session by the user, and/or a confirmation of a request to establish a gaming assistance session by the gaming expert. For example, the user's information handling system may connect directly to an information handling system of the expert for the gaming assistance session. Alternatively or additionally an intermediary server may facilitate communications between the user's information handling system and the gaming expert's information handling system. The gaming assistance session may include voice chat between the user and the gaming expert, text and image messaging between the user and the gaming expert, transmission of video and audio data from the gaming application between the user and the gaming expert, and/or transmission and reception of input information entered by the user and/or the expert. Such communications may be displayed by a user interface on a display of the user's information handling system and by a display of the gaming expert's information handling system. In some embodiments, the user interface for the gaming assistance session may be overlaid on a window of the gaming application. As one example, the gaming assistance session may include a game streaming session, where live video and/or audio of the gaming application is streamed from the information handling system of the user to an information handling system of the expert for real-time analysis. In some embodiments, gameplay of a gaming assistance session may be recorded for later viewing by a user and an expert. Thus, users requesting assistance with gaming applications may be connected with experts for gaming assistance sessions based, at least in part, on gaming characteristics of available gaming experts.

Figure 9:
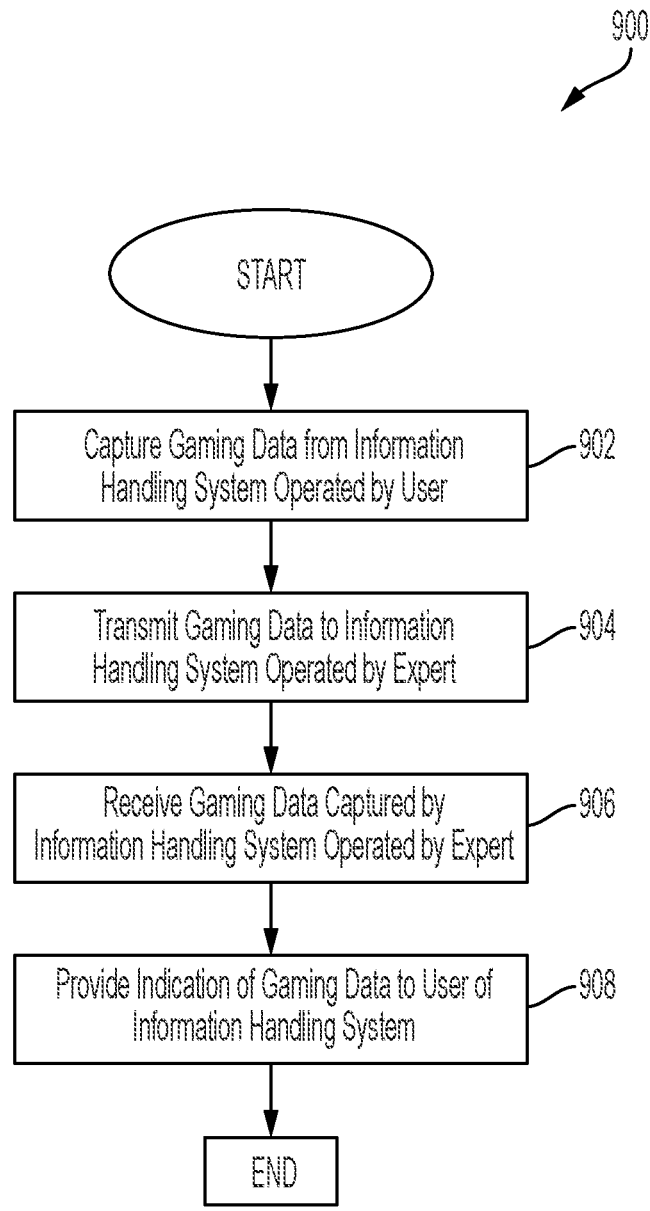
FIG. 9 is a flow chart of an example method for sharing gaming data between a user and an expert according to some embodiments of the disclosure.

A gaming assistance session may include transmission of gaming data between a user's information handling system and a gaming expert's information handling system, as shown in the method 900 of FIG. 9. In some embodiments, the method 900 of FIG. 9 may be performed by a user's information handling system. The method 900 may be performed as part of a gaming assistance session described with respect to step 806 of FIG. 8. The method 900 may begin at step 902 with capturing gaming data from an information handling system operated by a user who requested assistance with a gaming application. Gaming data may include video and audio data generated by a gaming application and/or input data generated by one or more input devices, such as a mouse, keyboard, or gamepad, connected to the user's information handling system. Input generated by one or more input devices may, for example, include gaming overlay input data, such as selections or drawing by touch or mouse and/or input by keyboard to be overlaid on a window displaying video of the gaming application. In some embodiments, an application or background process, separate from the gaming application, may capture such data. Such data may, in some embodiments, be captured at a graphics card or audio card level to facilitate efficient transmission of gaming data to a gaming expert's information handling system.

At step 904, the gaming data may be transmitted to an information handling system operated by a gaming expert connected to the user for a gaming assistance session. In some embodiments, input data may be streamed from the user's information handling system to the expert's information handling system as it is received from one or more peripheral input devices. Likewise, video and/or audio data generated for a gaming application may also be streamed real-time to the expert's information handling system. In some embodiments, an intermediary information handling system may receive the gaming data from the user's information handling system and may forward the gaming data to the expert's information handling system to enhance security.

At step 906, gaming data captured by the gaming expert's information handling system may be received. For example, the user's information handling system may receive gaming data from the gaming expert's information handling system similar to gaming data transmitted by the user's information handling system. Such gaming data may include video and audio data generated by a gaming application and/or input data generated by one or more input devices, such as a mouse, keyboard, or gamepad, connected to the user's information handling system. Input generated by one or more input devices may, for example, include gaming overlay input data, such as selections or drawing by touch or mouse and/or input by keyboard to be overlaid on a window displaying video of the gaming application. For example, an expert may draw, select, or otherwise enter input on a window displaying video received from the user's information handling system using an input device, such as a keyboard, mouse, or gamepad. Such information may be transmitted to an information handling system of the user. As another example, a gaming expert may play a gaming application alongside the user and video and/or audio of the gaming application executed by the expert's information handling system may be received by the user's information handling system. In a similar way, the gaming expert's information handling system may receive gaming data transmitted by the user's information handling system.

At step 908, an indication of the received gaming data may be provided to the user of the information handling system. In some embodiments, the user's information handling system may display gaming data received from the expert's information handling system on a display connected to the user's information handling system and/or output audio data received from the expert's information handling system to a speaker connected to the user's information handling system. For example, a window showing video data of a gaming application executed by the expert's information handling system may be displayed on the display connected to the user's information handling system, such as adjacent to a window displaying the gaming application being executed by the user's information handling system. In some embodiments, input data received from an expert's information handling system may be displayed on a display connected to the user's information handling system. For example, a gamepad, keyboard, or mouse may be illustrated on a display connected to the user's information handling system, and inputs selected, such as keys pressed or buttons pushed may be highlighted when such input data is received. Alternatively or additionally, received input data may be indicated to the user in other ways, such as through triggering of haptic feedback in a gamepad connected to the user's information handling system upon receipt of a command from the expert's information handling system or illuminating keys of a keyboard connected to the user's information handling system when input is received from the expert's information handling system indicating that a key has been pressed. For example, keys of a user's keyboard may be illuminated as input data indicating that keys are pressed by the expert's information handling system is received. As another example, an expert may otherwise command illumination of keys of a user's keyboard to direct the user as to when such keys should be pressed. Similarly, the gaming expert's information handling system may provide an indication of gaming data received from the user's information handling system to the gaming expert. In some embodiments a user may pass off control of a gaming application executed by the user's information handling system to an expert, and input data received from the expert's information handling system may be used to control the gaming application executed by the user's information handling system. Thus, a gaming assistance session may provide a variety of methods for an expert to communicate with a user.

Figure 10:
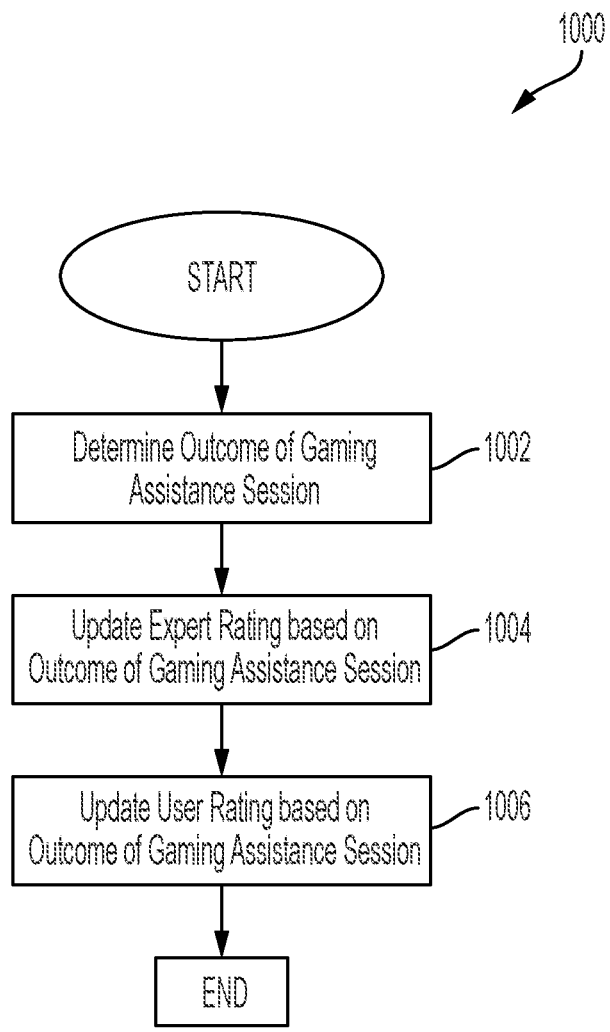
FIG. 10 is a flow chart of an example method for adjusting user and expert ratings based on feedback from a gaming assistance session according to some embodiments of the disclosure.

User and expert ratings may be adjusted based on outcomes of gaming assistance sessions. An example method 1000 for updating user and expert ratings following a gaming assistance session is shown in FIG. 10. The method 1000 may be performed by a user's information handling system, one or more intermediary information handling systems such as remote cloud-based server running the system 700 of FIG. 7, and/or by an information handling system of a gaming expert. At step 1002, an outcome of a gaming assistance session may be determined. In some embodiments, a user's improvement may be monitored following the gaming assistance session to determine if the user's gaming statistics improve following the gaming assistance session. For example, if a user completes a certain portion of a game for which the gaming assistance was requested, the user, the expert, and the gaming assistance session itself may receive a high score following the gaming assistance session. Additional user statistics may be monitored following a gaming assistance session as well and used to determine an outcome, such as a score, of the gaming assistance session. Feedback from the user and the gaming expert may also be used to determine the outcome of the gaming assistance session. For example, a user may be requested to provide feedback as to a skill level of the expert, a communication ability of the expert, a friendliness of the expert, linguistic abilities of the expert, a gaming style of the expert, and other gaming characteristics of the expert connected to the user in the gaming assistance session. The expert may similarly be asked to provide feedback regarding gaming characteristics of the user following the gaming assistance session. Such feedback may, for example, be received by a remote information handling system executing a system for matching gamers with gaming experts.

At step 1104, a rating of the gaming expert may be updated based on the outcome of the gaming assistance session. In some embodiments, one or more gaming characteristics of the gaming expert may be updated based on the outcome of the gaming assistance session. In some embodiments, separate gaming characteristic ratings may be maintained for a gaming expert's skill level and a gaming expert's teaching ability or ability at providing gaming assistance. For example, a gaming expert may have a high level of gaming expertise but may not have high skill at providing gaming assistance. Thus, if a gaming assistance session has a poor outcome due to a poor ability of the expert to provide gaming assistance rather than due to a poor gaming expertise of the gaming expert, a rating for an expert's ability at providing gaming assistance may be lowered, while a rating of the expert's gaming ability may remain the same. In some embodiments, rewards may also be allocated to the expert following a gaming assistance session based on the determined outcome. In some embodiments, gaming characteristics of the gaming expert may be updated based on feedback received from the user connected to the gaming expert, such as personality or gaming style characteristics of the gaming expert. Furthermore, if a gaming assistance session is determined to have a positive outcome, the expert's gaming characteristics may be updated to indicate that the gaming expert pairs well with users having gaming characteristics similar to the user.

At step 1006, a rating of the user may be updated based on the outcome of the gaming assistance session. For example, if the user's gaming performance improves following the gaming assistance session, a gaming characteristic rating related to the user's gaming skill level or ability may be updated and/or increased. A user may also have a gaming assistance rating gaming characteristic separate from gaming skill level gaming characteristics of the user. For example, an expert may provide feedback on the user's personality and how easy the user is to work with. If such feedback is positive, a user's gaming assistance rating may be increased, but if such feedback is poor, a user's gaming assistance rating may be decreased. In some embodiments, gaming characteristics of the user may be updated based on feedback received from the expert connected to the user, such as personality or gaming style characteristics of the user or how easy the user is to work with. Furthermore, if a gaming assistance session is determined to have a positive outcome, the user's gaming characteristics may be updated to indicate that the user pairs well with gaming experts having gaming characteristics similar to the gaming expert.

Figure 11:
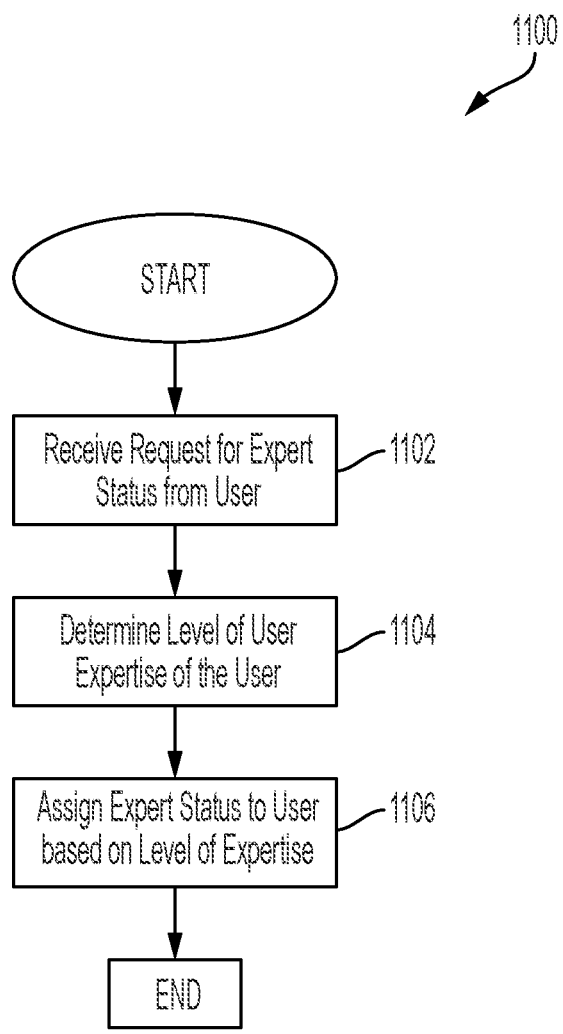
FIG. 11 is a flow chart of an example method for determining an expert status of a user according to some embodiments of the disclosure.

A user may qualify as a gaming expert based on gaming characteristics of the user related to the user's gaming performance and/or experience, such as an amount of time spent playing a particular game, an amount of time spent playing games of a particular genre, an amount of time spent gaming in general, gaming statistics of the user, gaming achievements obtained by the user, and other gaming characteristics. An example method 1100 for qualifying users of information handling systems as gaming experts is shown in FIG. 11. The method 1100 may be performed by a user's information handling system or by a remote information handling system, such as remote cloud-based server running the system 700 of FIG. 7. At step 1102, the method may include receipt of a request for expert status from a user. For example, a user of an information handling system may request to be assigned a status as a gaming expert to be able to engage as a gaming expert in gaming assistance sessions with other users. In some embodiments, such a request may be received by a remote server from an information handling system operated by the user. In some embodiments the request may be for expert status with respect to a particular gaming application, a particular genre of gaming applications, a particular play style, or gaming in general.

At step 1104, a level of expertise of the user may be determined. For example, an amount of time spent by the user playing a particular gaming application, playing gaming applications of a particular genre, or gaming in general may be determined. Alternatively or additionally, other user gaming characteristics, such as a kill to death ratio, speed run records, a number of victories in a multiplayer gaming application, a tournament placement in a gaming competition, completion percentages of one or more gaming applications or portions of gaming applications, such as a main story or campaign, achievements obtained in one or more gaming applications, and other user gaming characteristics may be analyzed to determine a level of expertise of the user. In some embodiments, the information handling system may provide one or more goals for the user, such as a completion percentage of a gaming application, a particular number of victories in a multiplayer gaming application, a particular amount of time spent in a particular gaming application, genre of gaming applications, or gaming in general, and other goals for the user to attain to be assigned a particular level of gaming expertise.

At step 1106, the user may be assigned expert status based on the determined level of user expertise. For example, if a user has attained certain levels of gaming performance as evidenced by gaming characteristics of the user, the user may be assigned certain levels of expertise. For example, if the user has attained a certain number of victories in a multiplayer gaming application, the user may be assigned an expert status based on the number of victories. In some embodiments different levels of expert status may be assigned based on different gaming characteristics possessed by the user. For example, when a user has spent 50 hours in a gaming application, the user may be assigned a first level of expertise in the gaming application, and when the user has spent 100 hours in the gaming application, the user may be assigned a second level of expertise in the gaming application. Users may be assigned expert status for a particular gaming application, for a particular genre of gaming applications, for a particular gaming play style, such as speed running, and for gaming in general. Users that are assigned an expert status may be considered for recommendation for users requesting gaming assistance.

Figure 12:
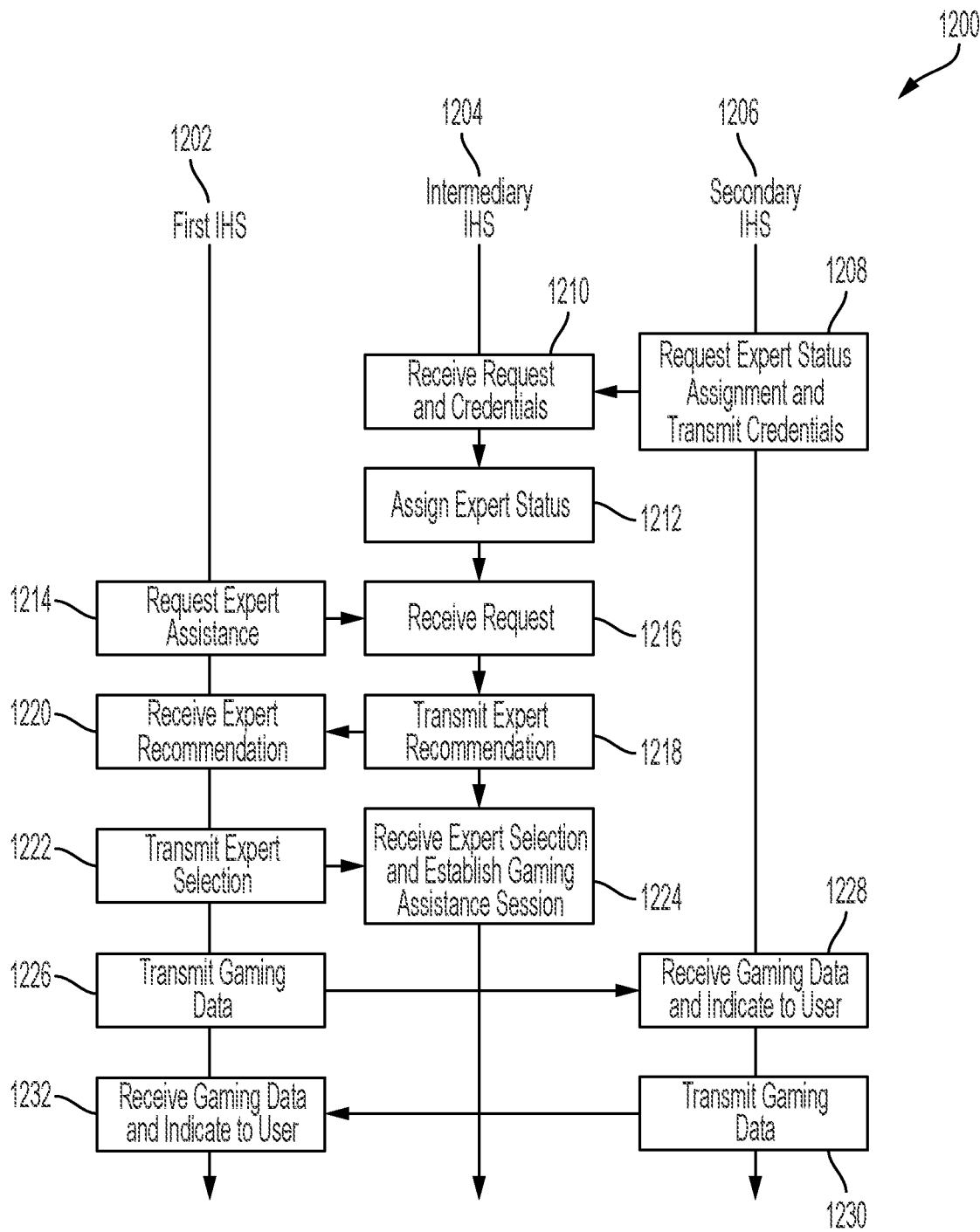
FIG. 12 is a process flow diagram of example communication between an information handling system of a user, an intermediary information handling system, and an information handling system of a gaming expert according to some embodiments of the disclosure.

A user's information handling system, an expert's information handling system, and one or more remote servers may communicate to connect users with experts for gaming assistance sessions. An example process flow diagram 1200 for connecting a first information handling system 1202 with a second information handling system 1206 via an intermediary information handling system 1204 is shown in FIG. 12. The first information handling system may be an information handling system of a user, or "gamer," and the second information handling system 1206 may be an information handling system of a user qualified as a "gaming expert." The intermediary information handling system 1204 may, for example, be a remote cloud-based server for running a platform for connecting users to gaming experts. In some embodiments, the intermediary information handling system 1204 may comprise one or more databases for storing user and expert gaming characteristics and statuses.

At block 1208, the second information handling system 1206, such as an information handling system operated by an expert, may request expert status assignment and may transmit expert credentials. Such credentials may, for example, be gaming characteristics of the user requesting expert status assignment. At step 1210, the intermediary information handling system 1204 may receive and analyze the request and credentials. If the user meets certain gaming characteristic thresholds for assignment of expert status, such as certain gameplay time requirements or gaming statistics, the intermediary information handling system may assign an expert status to the user, at block 1212. In some embodiments, the new expert may be granted a badge or other indicator of their expert status to display on their profile. An expert status may be assigned for a particular gaming application, for a particular genre of gaming applications, for a particular play style, or for gaming in general. Once expert status is assigned, the intermediary information handling system 1204 may begin to include the assigned expert in recommendations of experts to users requesting gaming assistance.

At block 1214, the first information handling system 1202, such as an information handling system operated by a user, may request expert assistance. In some embodiments, the user requesting assistance may also be a gaming expert, having been assigned a gaming expert status themselves. At block 1216, the intermediary information handling system 1204 may receive the request from the first information handling system 1202 and may determine one or more experts for recommendation to the user. If the user is a user having an expert status, experts having expertise that exceeds the user's level of expertise may be recommended to the user. The expert operating the second information handling system 1206 may be recommended if gaming characteristics of the expert indicate that the expert would be able to provide assistance to the user with the gaming application for which assistance was requested. At block 1218, the intermediary information handling system 1204 may transmit a determined recommendation of one or more gaming experts to the first information handling system 1202, and at block 1220 the first information handling system 1202 may receive the recommendation of one or more experts. The user of the first information handling system 1202 may select one or more gaming experts from the received recommendation of gaming experts, such as the expert operating the second information handling system 1206, and, at block 1222, the first information handling system may transmit the expert selection to the intermediary information handling system 1204.

At block 1224, the intermediary information handling system may receive the expert selection from the first information handling system 1202 and may establish a gaming assistance session between the first information handling system 1202 and the second information handling system 1206. In some embodiments, the received expert selection may include an indication that the user wishes to establish a gaming assistance session with the selected gaming expert. In some embodiments, the intermediary information handling system 1204 will request and receive confirmation from the second information handling system 1206 before establishing the gaming assistance session between the first information handling system 1202 and the second information handling system 1206. Establishing the gaming assistance session may include providing information to the first information handling system 1202 and the second information handling system 1206 to allow the first information handling system 1202 and the second information handling system 1206 to connect directly, such as network information for connecting the first and second information handling systems 1202, 1206. Alternatively or additionally, the intermediary information handling system may indicate to the first information handling system 1202 and the second information handling system 1206 that the intermediary information handling system 1204 is ready to receive and forward data between the first and second information handling systems 1202, 1206.

At step 1226, the first information handling system may transmit gaming data, and at step 1228, the second information handling system may receive the gaming data and may provide an indication of the received gaming data to a user. In some embodiments, the transmitted gaming data may be received by the intermediary information handling system 1204 and forwarded to the second information handling system 1206. Gaming data may, for example, include video and audio data from the gaming application executed by the first information handling system, input data such as keyboard input data, mouse input data, gamepad input data, and/or touch screen input data, voice data for voice chatting between the user and the expert, text and image data for text chatting between the user and the expert, video data from a camera for video chatting between the user and the expert, and other gaming data. Such data may be indicated to the gaming expert by the second information handling system 1206 using a display, a speaker, one or more peripheral input devices, and/or one or more additional devices connected to the second information handling system 1206.

Similarly, at step 1230, gaming data generated by the second information handling system 1206 may be transmitted to the first information handling system 1202, and, at step 1232, the first information handling system 1202 may receive and provide an indication of the received gaming data to the user. In some embodiments, the transmitted gaming data may be received by the intermediary information handling system 1204 and forwarded to the first information handling system 1202. Gaming data may, for example, include video and audio data from the gaming application executed by the second information handling system 1206, such as for parallel gaming sessions between the user and the expert, input data such as keyboard input data, mouse input data, gamepad input data, and/or touch screen input data, voice data for voice chatting between the user and the expert, text and image data for text chatting between the user and the expert, video data from a camera for video chatting between the user and the expert, and other gaming data. Such data may be indicated to the user by the first information handling system 1202 using a display, a speaker, one or more peripheral input devices, and/or one or more additional devices connected to the second information handling system. In some embodiments, one or more information handling systems of one or more users may be connected to one or more information handling systems of one or more experts in a single gaming assistance session. For example, multiple members of an e-sports or competitive gaming team may be connected to one or more gaming experts in a gaming assistance session, such as a coaching session. Thus, a first information handling system 1202, second information handling system 1206, and intermediary information handling system 1204 may communicate with each other to facilitate gaming assistance sessions between gamers and gaming experts.

The flow chart diagrams of FIGS. 8-11 and the process flow diagram of FIG. 12 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for communication between a user and a gaming expert, comprising:
    receiving, by a first information handling system, a request from the user for expert assistance associated with a gaming application;
    determining, by the first information handling system, a recommendation of one or more experts from a plurality of available experts based, at least in part, on the gaming application and one or more gaming characteristics of each of the plurality of available experts, wherein the one or more gaming characteristics of each of the plurality of available experts includes a level of experience of each of the plurality of available experts; and
    initiating, by the first information handling system, a gaming assistance session between the user and at least one of the determined experts.

2. The method of claim 1, wherein initiating the gaming assistance session between the user and at least one of the determined experts comprises at least one of:
    initiating a text chat session between the user and the at least one of the determined experts;
    initiating a voice chat session between the user and the at least one of the determined experts; or
    initiating a game streaming session between the user and the at least one of the determined experts.

3. The method of claim 2, wherein initiating a game streaming session between the user and the at least one of the determined experts comprises:
    capturing video and audio data generated by the first information handling system for the gaming application; and
    transmitting the video and audio data generated by the first information handling system to a second information handling system operated by the at least one of the determined experts for display on a display of the second information handling system.

4. The method of claim 1, further comprising:
    receiving, by the first information handling system, input information from a second information handling system operated by the at least one of the determined experts; and
    providing an indication of the input information to the user.

5. The method of claim 4, wherein the received input information comprises at least one of:
    gamepad input from a gamepad connected to the second information handling system;
    keyboard input from a keyboard connected to the second information handling system;
    mouse input from a mouse connected to the second information handling system; or
    gaming overlay input from one or more input devices connected to the second information handling system for overlay on a window of the gaming application on a display of the first information handling system.

6. The method of claim 4, wherein providing the indication of the input information to the user comprises at least one of:
    displaying an indication of the input information on a display of the first information handling system;
    triggering haptic feedback in one or more peripherals connected to the first information handling system; or
    adjusting illumination of one or more keys of a keyboard connected to the first information handling system.

7. The method of claim 1, wherein the one or more gaming characteristics of each of the plurality of available experts further comprise at least one of:
    a level of experience of the expert related to the gaming application;
    a level of experience of the expert related to a genre of the gaming application;
    a level of general gaming experience of the expert; and
    an area of gaming expertise of the expert.

8. The method of claim 1, further comprising:
    receiving, by the first information handling system, feedback regarding performance of at least one of the user and the at least one of the determined experts; and
    updating, by the first information handling system, a rating of at least one of the user and the at least one of the determined experts based, at least in part, on the received feedback.

9. The method of claim 8, wherein determining one or more experts for recommendation to the user from a plurality of available experts based, at least in part, on one or more gaming characteristics of each of the plurality of available experts is performed using a matchmaking model, further comprising:
  updating the matchmaking model based on the received feedback.

10. A first information handling system, comprising:
a processor; and
a memory,
wherein the processor is configured to perform steps comprising:
  receiving, by the first information handling system, a request from a user for expert assistance associated with a gaming application;
  determining, by the first information handling system, a recommendation of one or more experts from a plurality of available experts based, at least in part, on the gaming application and one or more gaming characteristics of each of the plurality of available experts, wherein the one or more gaming characteristics of each of the plurality of available experts includes a level of experience of each of the plurality of available experts; and
  initiating, by the first information handling system, a gaming assistance session between the user and at least one of the determined experts.

11. The first information handling system of claim 10, wherein initiating the gaming assistance session between the user and at least one of the determined experts comprises at least one of:
  initiating a text chat session between the user and the at least one of the determined experts;
  initiating a voice chat session between the user and the at least one of the determined experts; or
  initiating a game streaming session between the user and the at least one of the determined experts.

12. The first information handling system of claim 11, wherein initiating a game streaming session between the user and the at least one of the determined experts comprises:
  capturing video and audio data generated by the first information handling system for the gaming application; and
  transmitting the video and audio data generated by the first information handling system to a second information handling system operated by the at least one of the determined experts for display on a display of the second information handling system.

13. The first information handling system of claim 10, wherein the processor is further configured to perform steps comprising:
  receiving, by the first information handling system, input information from a second information handling system operated by the at least one of the determined experts; and
  providing an indication of the input information to the user.

14. The first information handling system of claim 13, wherein the received input information comprises at least one of:
  gamepad input from a gamepad connected to the second information handling system;
  keyboard input from a keyboard connected to the second information handling system;
  mouse input from a mouse connected to the second information handling system; or
  gaming overlay input from one or more input devices connected to the second information handling system for overlay on a window of the gaming application on a display of the first information handling system.

15. The first information handling system of claim 13, wherein providing the indication of the input information to the user comprises at least one of:
  displaying an indication of the input information on a display of the first information handling system;
  triggering haptic feedback in one or more peripherals connected to the first information handling system; or
  adjusting illumination of one or more keys of a keyboard connected to the first information handling system.

16. The first information handling system of claim 10, wherein the one or more gaming characteristics of each of the plurality of available experts further comprise at least one of:
  a level of experience of the expert related to the gaming application;
  a level of experience of the expert related to a genre of the gaming application;
  a level of general gaming experience of the expert; and
  an area of gaming expertise of the expert.

17. The first information handling system of claim 10, wherein the processor is further configured to perform steps comprising:
  receiving, by the first information handling system, feedback regarding performance of at least one of the user and the at least one of the determined experts; and
  updating, by the first information handling system, a rating of at least one of the user and the at least one of the determined experts based, at least in part, on the received feedback.

18. The first information handling system of claim 17, wherein determining one or more experts for recommendation to the user from a plurality of available experts based, at least in part, on one or more gaming characteristics of each of the plurality of available experts is performed using a matchmaking model, wherein the processor is further configured to perform steps comprising:
  updating the matchmaking model based on the received feedback.

19. A method, comprising:
  receiving, by a first information handling system, a request from a first user for assistance associated with a gaming application;
  initiating, by the first information handling system, a connection between the first information handling system and a second information handling system operated by a second user, wherein the connection is initiated based on one or more gaming characteristics of the second user, and wherein the one or more gaming characteristics of the second user comprise a level of experience of the second user;
  receiving, by the first information handling system, input data regarding input received from a peripheral device connected to the second information handling system; and
  providing an indication of the input data to the first user of the first information handling system.

20. The method of claim 19, wherein the input received from the peripheral connected to the second information handling system comprises key input from a keyboard connected to the second information handling system, and wherein providing the indication of the input data to the first user of the first information handling system comprises illuminating one or more keys of a keyboard connected to the first information handling system based on the key input.

\* \* \* \* \*